(12) United States Patent
Fernandes et al.

(10) Patent No.: US 11,291,981 B2
(45) Date of Patent: Apr. 5, 2022

(54) BORON-BASED ELECTRON DONORS FOR ZIEGLER-NATTA CATALYST SYSTEMS

(71) Applicant: BRASKEM AMERICA, INC., Philadelphia, PA (US)

(72) Inventors: Jonas Alves Fernandes, Pittsburgh, PA (US); Binh Thanh Nguyen, League City, TX (US)

(73) Assignee: Braskem America, Inc., Philadelphia, PA (US)

( * ) Notice: Subject to any disclaimer, the term of this patent is extended or adjusted under 35 U.S.C. 154(b) by 6 days.

(21) Appl. No.: 16/102,653

(22) Filed: Aug. 13, 2018

(65) Prior Publication Data

US 2019/0046965 A1 Feb. 14, 2019

Related U.S. Application Data

(60) Provisional application No. 62/545,272, filed on Aug. 14, 2017.

(51) Int. Cl.
| | |
|---|---|
| *B01J 31/14* | (2006.01) |
| *C08F 4/02* | (2006.01) |
| *C08F 210/00* | (2006.01) |
| *C08F 110/06* | (2006.01) |
| *C08F 10/06* | (2006.01) |
| *C08F 10/02* | (2006.01) |

(52) U.S. Cl.
CPC ........... *B01J 31/146* (2013.01); *B01J 31/143* (2013.01); *C08F 4/022* (2013.01); *C08F 110/06* (2013.01); *C08F 210/00* (2013.01); *B01J 2231/122* (2013.01); *B01J 2531/0247* (2013.01); *B01J 2531/22* (2013.01); *B01J 2531/46* (2013.01); *C08F 10/02* (2013.01); *C08F 10/06* (2013.01); *C08F 2500/15* (2013.01)

(58) Field of Classification Search
None
See application file for complete search history.

(56) References Cited

U.S. PATENT DOCUMENTS

| | | | | |
|---|---|---|---|---|
| 4,762,898 | A * | 8/1988 | Matsuura | ................ C08F 10/02 502/121 |
| 6,559,249 | B2 * | 5/2003 | Yang | ..................... C08F 110/02 502/103 |
| 2004/0023792 | A1 | 2/2004 | Yang et al. | |
| 2004/0138054 | A1 | 7/2004 | Wagner et al. | |
| 2012/0178888 | A1 | 7/2012 | Jorgensen et al. | |
| 2016/0185886 | A1 | 6/2016 | Nguyen et al. | |

FOREIGN PATENT DOCUMENTS

| | | |
|---|---|---|
| EP | 0 250 225 A2 | 12/1987 |
| GB | 2 044 783 A | 10/1980 |
| JP | 11-080238 A | 3/1999 |
| KR | 10-2009-0087631 A | 8/2009 |
| WO | WO-03/000747 A1 | 1/2003 |
| WO | WO-2017/027710 A1 | 2/2017 |
| WO | WO-2017/204811 A1 | 11/2017 |

OTHER PUBLICATIONS

International Search Report & Written Opinion in International Application No. PCT/US2018/046538, dated Dec. 18, 2018.

* cited by examiner

*Primary Examiner* — Yun Qian
(74) *Attorney, Agent, or Firm* — Foley & Lardner LLP

(57) ABSTRACT

A catalytic system for use in olefinic polymerization, includes titanium, magnesium, a halogen, organoaluminium, and a boron-based electron donor.

8 Claims, 5 Drawing Sheets

BORON-BASED ELECTRON DONORS FOR ZIEGLER-NATTA CATALYST SYSTEMS

CROSS-REFERENCE TO RELATED APPLICATIONS

This application claims the benefit of priority to U.S. Provisional Patent Application No. 62/545,272, filed on Aug. 14, 2017, the contents of which are incorporated herein by reference in their entirety.

FIELD

The present technology is generally related to polyolefin catalysts. More specifically, the technology is related to electron donors containing boron as part of the Ziegler-Natta ("ZN") catalyst system.

SUMMARY

In one aspect, a solid catalyst component for use in olefinic polymerization is provided; the solid pre-catalyst component includes titanium, magnesium, a halogen, and a boron-based internal electron donor. The boron-based internal electron donor may include a boronate, or at least one boron-oxygen bond. The boron-based electron donor may be represented by Formula (I):

$$B(OR^1)R^2R^3 \qquad (I).$$

In Formula (I), each $R^1$ is individually H, linear or branched alkyl, cycloalkyl, aryl, heterocyclyl, or heteroaryl, any of which may be optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; $R^2$ and $R^3$ are individually linear or branched alkyl, cycloalkyl, aryl, heterocyclyl, heteroaryl, each of which may be optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; or $OR^1$, or $R^2$ and $R^3$ may join together and with the boron atom form a borinane ring. As set forth herein, when present, the borinane ring may be of the following formula:

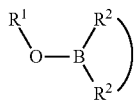

In another aspect, a solid pre-catalyst component for use in olefinic polymerization is provided, the solid pre-catalyst component including a reaction product of a titanium compound, a magnesium compound, and a boron-based internal electron donor as described.

In another aspect, a catalyst system for use in olefinic polymerization is provided, the catalyst system including any of the olefin polymerization pre-catalysts described herein with an organoaluminum compound. In some embodiments, the solid pre-catalyst component described herein may further include at least one secondary internal donor as described herein. In some embodiments, the catalyst system may further include an organosilicon or boron-based compound.

In another aspect, a process is provided for polymerizing or co-polymerizing an olefin monomer, the process including providing any of the catalyst systems described herein, polymerizing or co-polymerizing the olefin monomer in the presence of the catalyst system to form a polymer or a co-polymer; and recovering the polymer or the co-polymer.

DETAILED DESCRIPTION

Figure 1:
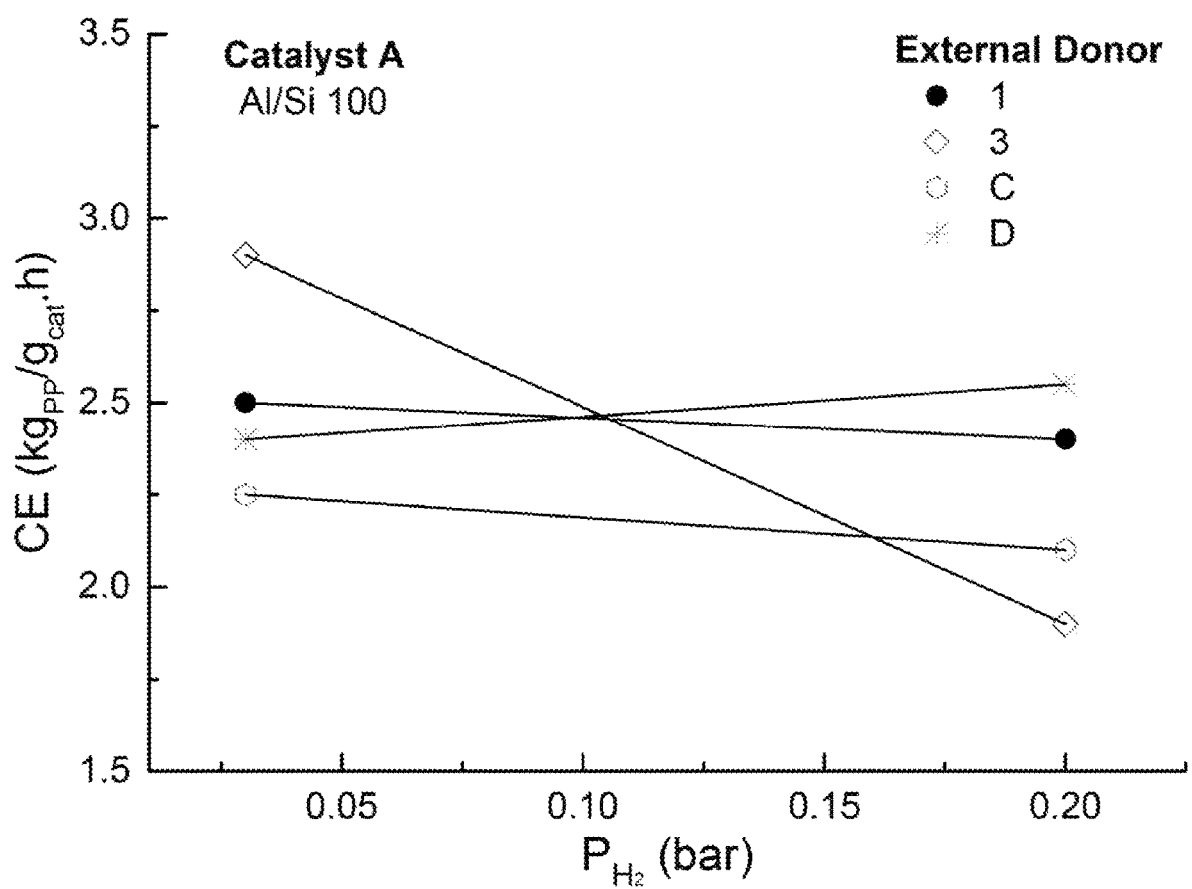
FIG. 1 provides a graph describing the influence of $H_2$ under different polymerization conditions in terms of catalyst efficiency, based upon the results of Example 10.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

The definition of further substituted is expanded to also include alkylation or arylation of the underlying alkyl, aryl, heteroaryl, heterocyclyl, or cyclyl groups. This means that, e.g. an aryl group may also include alkyl groups, aryl groups, fused ring structures, and the like. This also means that general reference to the aryl group, e.g. "phenyl," includes tolyl, tert-butyl, di-tert-butyl, bi-phenyl, anthracenyl, and the like.

As used herein, "alkyl" groups include straight chain and branched alkyl groups having from 1 to about 20 carbon atoms, and typically from 1 to 12 carbons or, in some embodiments, from 1 to 8 carbon atoms. Alkyl groups may be substituted or unsubstituted. An alkyl group may be substituted one or more times. An alkyl group may be substituted two or more times. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, isopentyl groups, and 1-cyclopentyl-4-methylpentyl. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that may further have straight or branched chain alkyl groups bonded thereto as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $\rangle$CH—CH=CH$_2$, $\rangle$C=CH$_2$, or $\rangle$C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

As used herein, the prefix "halo" refers to a halogen (i.e. F, Cl, Br, or I) being attached to the group being modified by the "halo" prefix. For example, haloaryls are halogenated aryl groups.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth.

The performance of Ziegler-Natta catalysts for propylene polymerization is heavily influenced by the ability of any internal electron donors to interact with the $TiCl_4$ and $MgCl_2$ lattice during the preparation of the pre-catalyst. The manner and extent to which the internal electron donors interact, affects the properties of the catalyst such as catalyst kinetics, catalyst activity, and properties of the polymers produced with the catalysts, as well as being friendlier with regard to regulatory considerations. However, designing new internal donor families for Ziegler-Natta catalysts that result in suitable catalyst performance to achieve the required polymer properties, remains a challenging task. Provided herein is a new class of internal electron donors, solid pre-catalyst components, and catalyst systems based upon boron-containing compounds.

In one aspect, a solid pre-catalyst component containing titanium, magnesium, halogen and a boron-based internal electron donor. In the solid pre-catalyst component, the boron-based internal electron donor may be a boronate, or a mixture of any two or more such compounds, or a mixture with any other non-boron-based internal electron donors. In some embodiments, the boron-based internal electron donor includes a compound having at least one boron-oxygen bond. Also provided herein are olefin polymerization catalyst systems containing the solid pre-catalyst components, organoaluminum, and organosilicon or boron-based donors. In other aspects, methods of making the solid pre-catalyst components and the catalyst systems are provided. Additionally, methods of polymerizing and co-polymerizing olefins using the catalyst systems are provided.

Illustrative boron-based electron donors include, but are not limited to, those represented by Formula (I): $B(OR^1)R^2R^3$. In Formula (I), each $R^1$ is individually H, linear or branched alkyl, cycloalkyl, aryl, heterocyclyl, or heteroaryl, any of which may be optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; $R^2$ and $R^3$ are individually linear or branched alkyl, cycloalkyl, aryl, heterocyclyl, heteroaryl, each of which may be optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; or $OR^1$, or $R^2$ and $R^3$ may join together and with the boron atom form a borinane ring. In some embodiments of Formula (I), each $R^1$ may be individually $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, $R^2$ may be $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, or $OR^1$, and $R^3$ may be $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, or $OR^1$. In any of the above embodiments, where "alkyl" is used, it may be a straight or branched chain alkyl. In any of the above embodiments of Formula (I), each $R^1$ may be methyl, ethyl, n-propyl, iso-propyl, n-butyl, sec-butyl, tert-butyl, n-pentyl, sec-pentyl, neo-pentyl, cyclohexyl, phenyl, naphthyl, anthracenyl, or an alkylated, arylated, or substituted group thereof. In any of the above embodiments of Formula (I), $R^2$ and $R^3$ may be individually $C_1$-$C_8$ alkyl, $C_3$-$C_{12}$ cycloalkyl, $C_5$-$C_{12}$ aryl, or $OR^1$. In any of the above embodiments of Formula (I), $R^2$ and $R^3$ may be individually $C_1$-$C_8$ alkyl or $OR^1$.

Illustrative boron-based electron donors include, but are not limited to, trimethyl borate, triethyl borate, tri-n-propyl borate, tri-n-butyl borate, dimethyl phenylboronate, diphenyl methylboronate, diphenyl ethylboronate, diphenyl n-propylboronate, diphenyl isopropylboronate, triphenyl borate, diethyl 1-phenylethyl borate, diethyl phenylboronate, diethyl-(3,5-di-tert-butylphenyl)boronate, dimethyl-[1, 1'-biphenyl]-3-yl-boronate, dimethyl naphthalene-1-yl-boronate, dimethyl cyclohexylboronate, diethyl cyclohexylboronate, dimethyl cyclopentylboronate, diethyl cyclopenthylboronate, dimethyl (furan-2-yl)boronate, diethyl (furan-2-yl)boronate, methyl ethyl (furan-2-yl)boronate, dimethyl (thien-2-yl)boronate, diethyl (thien-2-yl)boronate, or ethyl methyl (thien-2-yl)boronate.

In some embodiments, the solid pre-catalyst component may further include a secondary internal electron donor selected from the group consisting of mono- or poly-carboxylic esters, mono- or poly-carboxylic ethers, mono- or poly-carboxylic ketones; organic compounds containing carboxylic and ether groups; organic compounds containing carboxylic groups and carbonyl groups; and organic compounds containing carboxylic groups, ether groups, and carbonyl groups. Illustrative secondary internal donors include, but are not limited to those of Formulae (II), (III), (IV), (V), (VI), (VII), (VIII), and (IX), or mixtures of any two or more such compounds. The Formulae are:

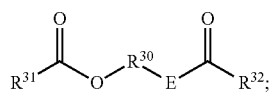
(II)

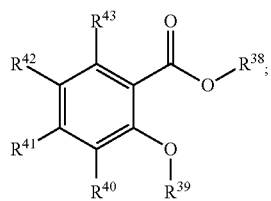
(III)

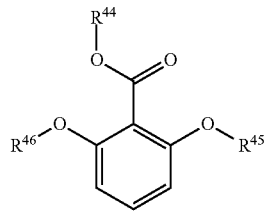
(IV)

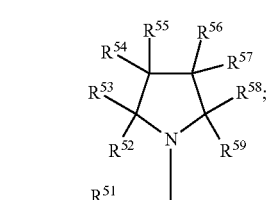
(V)

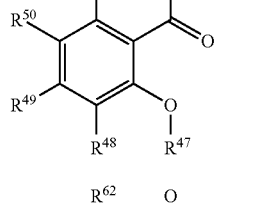
(VI)

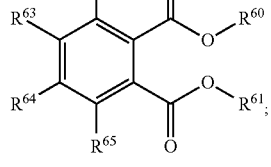

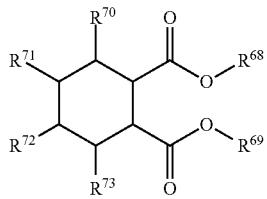
(VII)

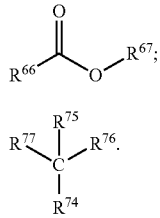
(VIII)

(IX)

$R^{30}$ is selected from the group consisting of O, —$CR^{33}R^{34}$—, —$N(R^{35})$—, S, —$P(R^{35})$—, —$Si(R^{36})_2$—, cycloalkylene, alkenylene, alkynylene, heterocyclylene, arylene, and heteroarylene;

E is selected from the group consisting of —$CR^{33}R^{34}$—, O, S, $OS(=O)_2O$—, —$OS(=O)O$—, —$S(=O)O$—, —$N(R^{35})$—, S, —$P(R^{35})$—, and —$Si(R^{36})_2$—;

$R^{31}$ and $R^{32}$ are individually selected from the group consisting of H, $OR^{35}$, $SR^{37}$, $NR^{35}_2$, $PR^{35}_2$, $Si(R^{36})_2$, alkyl, alkenyl, alkynyl, cycloalkyl, heterocyclyl, aryl, and heteroaryl;

$R^{33}$ and $R^{34}$ are individually selected from the group consisting of is H, alkyl, and cycloalkyl;

$R^{35}$ is selected from the group consisting of H, alkyl, and aryl;

$R^{36}$ is selected from the group consisting of H, $OR^{35}$, alkyl, and aryl;

$R^{37}$ is selected from the group consisting of haloaryl, haloheteroaryl, and haloheterocyclyl.

$R^{38}$ may be selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —$CH_2$— group or a —N═ group in place of a —C═ group, and wherein the hydrocarbyl group is optionally substituted by one or more halogens;

$R^{39}$ may be selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —$CH_2$— group or a —N═ group in place of a —C═ group, and wherein the hydrocarbyl group is optionally substituted by one or more halogens;

$R^{40}$, $R^{41}$, $R^{42}$, and $R^{43}$ may each independently be selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains —O—, —NH—, or —S— group in place of a —$CH_2$— group or a —N═ group in place of a —C═ group, and wherein the hydrocarbyl group is optionally substituted by one or more halogens;

$R^{44}$, $R^{45}$, and $R^{46}$ may each independently be selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{47}$ may be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{48}$, R$^{49}$, R$^{50}$, and R$^{51}$ may each independently be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{52}$, R$^{53}$, R$^{54}$, R$^{55}$, R$^{56}$, R$^{57}$, R$^{58}$, and R$^{59}$ may each independently be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{60}$ and R$^{61}$ may each independently be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{62}$, R$^{63}$, R$^{64}$ and R$^{65}$ may each independently be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{66}$ may be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{67}$ may be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens;

R$^{68}$ and R$^{69}$ may each independently be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens; and R$^{70}$, R$^{71}$, R$^{72}$, and R$^{73}$ may each independently be selected from the group consisting of a hydrogen; a halogen; and a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group or a —N═ group in place of a —C═ group, and wherein the hydrocarbyl group is optionally substituted by one or more halogens.

R$^{74}$ and R$^{75}$ are each independently selected from the group consisting of a —CH$_2$OR$^{78}$, —COOR$^{78}$, —CR$^{78}$═O, —CHO, CH$_2$OH, —CH$_2$OSi(R$^{78}$)$_3$.

R$^{76}$, R$^{77}$, and R$^{78}$ are each independently selected from the group consisting of a linear or branched, cyclic or acyclic, saturated or non-saturated C$_1$ to C$_{22}$ hydrocarbyl group, wherein the hydrocarbyl group optionally contains a —O—, —NH—, or —S— group in place of a —CH$_2$— group; an aryl group; an alkylaryl group; and an arylalkyl group.

In some embodiments, where the secondary internal electron donor is represented by Formula (I), the compound description may be subject to a proviso. The provisos include, where E is O, R$^{31}$ and R$^{32}$ may not both be OR$^{35}$; where R$^{31}$ is OR$^{35}$, R$^{32}$ may not phenyl; and where E is O and R$^{30}$ is naphthyl, R$^{31}$ and R$^{32}$ may not both be phenyl. In some embodiments, R$^{30}$ may be cycloalkylene, alkylene, alkenylene, alkynylene, heterocyclylene, arylene, or heteroarylene.

Use of the boron-based electron donor contributes to improved performance characteristics of resultant catalyst system, such as high/improved catalyst activity, high/improved hydrogen response, the ability to produce polyolefins with desired/controllable crystallinity as measured by crystallization elution fractionation (CEF) and $^{13}$C NMR analysis, and desired/controllable molecular weight measured by melt flow indices and high temperature size exclusion chromatography (HSEC), and the like.

The solid pre-catalyst component result in a highly active catalyst system including a reaction product of a titanium compound, a magnesium compound, and a boron-based internal electron donor. The titanium compounds used in the preparation of the solid pre-catalyst component include, for example, a tetravalent titanium compound represented by chemical formula (I): Ti(OR)$_g$X$_{4-g}$ (I), where R represents a C$_1$-C$_{20}$ alkyl; X represents a halogen atom; and g is from 0 to 4, inclusive. Illustrative titanium compounds include, but are not limited to, titanium tetrahalides such as TiCl$_4$, TiBr$_4$, and TiI$_4$; alkoxytitanium trihalides such as Ti(OCH$_3$)Cl$_3$, Ti(OC$_2$H$_5$)Cl$_3$, Ti(O-n-C$_4$H$_9$)Cl$_3$, Ti(OC$_2$H$_5$)Br$_3$ and Ti(O-i-C$_4$H$_9$)Br$_3$; dialkoxytitanium dihalides such as Ti(OCH$_3$)$_2$Cl$_2$, Ti(OC$_2$H$_5$)$_2$Cl$_2$, Ti(O-n-C$_4$H$_9$)$_2$Cl$_2$ and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(O-n-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_4$ and Ti(O-n-C$_4$H$_9$)$_4$. Among these, the titanium tetrahalides, are employed in some embodiments. The titanium compounds may be used individually or in solutions of hydrocarbon compounds or halogenated hydrocarbons.

The magnesium compounds used in the preparation of the solid pre-catalyst component include, for example, a magnesium compound having no reducibility. In one embodiment, the magnesium compound having no reducibility is a halogen containing magnesium compound. Specific examples of the magnesium compound having no reducibility include, but are not limited to, magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

In one aspect, halogen containing magnesium compounds, such as magnesium chloride, alkoxy magnesium chlorides and aryloxy magnesium chlorides, are employed.

When preparing the solid pre-catalyst component, a boron-based internal electron donor may be used/added alone, or in combination with other non-boron-based internal electron donors as are known in the art. The solid titanium catalyst component may be made by contacting a magnesium compound and a titanium compound with the boron-based internal electron donor. In one embodiment, the titanium pre-catalyst component is made by contacting a magnesium compound and a titanium compound in the presence of the boron-based internal electron donor. In another embodiment, the titanium pre-catalyst component is made by forming a magnesium-based catalyst support optionally with the titanium compound and optionally with the boron-based internal electron donor, and contacting the magnesium-based pre-catalyst support with the titanium compound and the boron-based internal electron donor.

In one embodiment, the solid catalyst component includes at least one of the boron-based internal electron donors, but does not include other internal electron donors. In another embodiment, the solid catalyst component includes other, non-boron-based internal electron donors in addition to the boron-based internal electron donor. For example, when preparing the solid catalyst component, other internal electron donors may be used/added in addition to the boron-based internal electron donor.

Examples of other, non-boron-based internal electron donors include oxygen-containing electron donors such as organic acid esters. Specific examples include, but are not limited to, diethyl ethylmalonate, diethyl propylmalonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diisononyl phthalate, di-2-ethylhexyl phthalate, diethyl succinate, dipropyl succinate, diisopropyl succinate, dibutyl succinate, diisobutyl succinate, dioctyl succinate, diisononyl succinate, and diether compounds such as 9,9-bis(methoxymethyl)fluorine, 2-isopropyl-2-isopentyl-1,3-dimethoxypropane, 2,2-diisobutyl-1,3-dimethoxypropane, 2,2-diisopentyl-1,3-dimethoxypropane, and 2-isopropyl-2-cyclohexyl-1,3-dimethoxypropane, in addition to materials such as (E)-8-((3-(4-fluorophenyl)acryloyl)oxy)naphthalen-1-yl furan-2-carboxylate; (E)-8-((3-(2-fluorophenyl)acryloyl)oxy)naphthalen-1-yl benzoate; (E)-8-((3-(4-fluorophenyl)acryloyl)oxy)naphthalen-1-yl benzoate; naphthalene-1,8-diyl (2E,2'E)-bis(3-phenylacrylate); 8-(cinnamoyloxy)naphthalen-1-yl benzoate; naphthalene-1,8-diyl (2E,2'E)-bis(2-methyl-3-phenylacrylate); naphthalene-1,8-diyl (2E,2'E)-bis(3-(p-tolyl)acrylate); naphthalene-1,8-diyl (2E,2'E)-bis(3-(o-tolyl)acrylate); naphthalene-1,8-diyl (2E,2'E)-bis(3-(4-fluorophenyl)acrylate); naphthalene-1,8-diyl (2E,2'E)-bis(3-(2-fluorophenyl)acrylate); 8-(cinnamoyloxy)naphthalen-1-yl [1,1'-biphenyl]-2-carboxylate; 8-acetoxynaphthalen-1-yl benzoate; 8-((cyclopropanecarbonyl)oxy)naphthalen-1-yl benzoate; 8-((cyclopentanecarbonyl)oxy)naphthalen-1-yl benzoate; 8-((3,3-dimethylbutanoyl)oxy)naphthalen-1-yl benzoate; 8-benzamidonaphthalen-1-yl benzoate; 8-(cinnamoyloxy) naphthalen-1-yl [1,1'-biphenyl]-4-carboxylate; (E)-8-((3-(2-fluorophenyl)acryloyl)oxy)naphthalen-1-yl furan-2-carboxylate; 8-((2-fluorobenzoyl)oxy)naphthalen-1-yl furan-2-carboxylate; 8-((4-fluorobenzoyl)oxy)naphthalen-1-yl furan-2-carboxylate; 8-(furan-2-carboxamido)naphthalen-1-yl furan-2-carboxylate; 1-benzoylcyclohexyl butyl carbonate; methyl 2-cyclopentyl-2-((methoxycarbonyl)oxy)-5-methylhexanoate; naphthalene-1,8-diyl bis(furan-2-carboxylate); 8-(benzoyloxy)naphthalen-1-yl 2-fluorobenzoate; 8-(benzoyloxy)naphthalen-1-yl furan-2-carboxylate; naphthalene-1,8-diyl bis(([1,1'-biphenyl]-4-carboxylate)); 8-(benzoyloxy)naphthalen-1-yl [1,1'-biphenyl]-4-carboxylate; 8-((cyclohexanecarbonyl)oxy) naphthalen-1-yl [1,1'-biphenyl]-4-carboxylate, dibenzo[b,d]furan-4,6-diyl bis(furan-2-carboxylate); dibenzo[b,d]furan-4,6-diyl diheptanoate; dibenzo[b,d]furan-4,6-diyl dipentanoate; dibenzo[b,d]furan-4,6-diyl bis(2-methoxybenzoate); [6-(2-methylbenzoyl)oxydibenzofuran-4-yl]-2-methylbenzoate; [6-(4-ethoxybenzoyl)oxydibenzofuran-4-yl]-4-ethoxybenzoate; [6-(4-methoxybenzoyl)oxydibenzofuran-4-yl]-4-methoxybenzoate; (6-benzoyloxydibenzofuran-4-yl) benzoate; and [6-(cyclohexanecarbonyloxy)dibenzofuran-4-yl] benzoate.

The boron-based internal electron donors may be used individually or in combination. In employing the boron-based internal electron donors, they do not have to be used directly as starting materials, but compounds convertible to the electron donors in the course of preparing solid pre-catalyst components may also be used as the starting materials.

Accordingly, in another aspect, a solid pre-catalyst component may be made by contacting a magnesium compound and a titanium compound with a boron-based internal electron donor. In one embodiment, the solid pre-catalyst component is made by contacting a magnesium compound and a titanium compound in the presence of a boron-based internal electron donor. In another embodiment, the solid pre-catalyst component is made by forming a magnesium-based pre-catalyst support crystal lattice optionally with a titanium compound and optionally with a boron-based internal electron donor, and contacting the magnesium-based pre-catalyst support crystal lattice with the titanium compound and the boron-based internal electron donor. In yet another embodiment, the solid pre-catalyst component is made by contacting a magnesium-based pre-catalyst support crystal lattice with a titanium compound to form a mixture, then contacting the mixture with the boron-based internal electron donor. In still yet other embodiments, the solid pre-catalyst component is made by contacting a magnesium-based pre-catalyst support crystal lattice with a titanium compound to form a mixture, then contacting the mixture with a boron-based internal electron donor, then contacting the mixture again with further boron-based internal electron donor. Such repeated contact with the boron-based internal electron donor can occur once, twice, three times, four times or more, successively or with other acts performed between contacts with additional doses of the boron-based internal electron donor.

Generally, the magnesium-based pre-catalyst support crystal lattice is made by dissolving a magnesium compound in a solvent mixture comprising an organic epoxy compound, an organic phosphorus compound and an optional inert diluent to form a homogenous solution.

The organic epoxy compounds include compounds having at least one epoxy group in the forms of monomers, dimmers, oligomers and polymers. Examples of epoxy compounds include, but are not limited to, aliphatic epoxy compounds, alicyclic epoxy compounds, aromatic epoxy compounds, or the like. Examples of aliphatic epoxy compounds include, but are not limited to, halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, or the like. Examples of alicyclic epoxy compounds include, but are not limited to, halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, or the like. Examples of aromatic epoxy compounds include, but are not limited to, halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, or the like.

Specific examples of epoxy compounds include, but are not limited to, epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, epoxypropyl)-4-chlorobenzene, 1-(3,4-epoxybutyl)-3-chlorobenzene, or the like. Specific examples of halogenated alicyclic epoxy compounds include 4-fluoro-1,2-cyclohexene oxide, 6-chloro-2,3 epoxybicyclo[2,2,1]heptane, or the like. Specific examples of halogenated aromatic epoxy compounds include 4-fluorostyrene oxide, 1-(1,2-epoxypropyl)-3-trifluorobenzene, or the like.

The organic phosphorus compounds may include, but are not limited to, hydrocarbyl esters and halohydrocarbyl esters of ortho-phosphoric acid and phosphorous acid. Specific examples include, but are not limited to, trimethyl phosphate, triethyl phosphate, tributyl phosphate, triphenyl phosphate, trimethyl phosphite, triethyl phosphite, tributyl phosphite and triphenyl phosphite.

To sufficiently dissolve a magnesium compound, an inert diluent may be added to the solvent mixture. The inert diluent can typically be aromatic hydrocarbons or alkanes, as long as it can facilitate the dissolution of the magnesium compound. Examples of aromatic hydrocarbons include, but are not limited to, benzene, toluene, xylene, chlorobenzene, dichlorobenzene, trichlorobenzene, chlorotoluene, and derivatives thereof. Examples of alkanes include linear, branched, or cyclic alkanes having about 3 to about 30 carbons, such as butane, pentane, hexane, cyclohexane, heptanes, and the like. These inert diluents may be used alone or in combination.

In embodiments of making the solid pre-catalyst component according to the Examples, the magnesium-based pre-catalyst support crystal lattice is mixed with a titanium compound such as liquid titanium tetrahalide to form a solid precipitate in the optional presence of an auxiliary precipitant. The auxiliary precipitant may be added before, during or after the precipitation of the solids and loaded on the solids.

The auxiliary precipitants may include carboxylic acids, carboxylic acid anhydrides, ethers, ketones, or mixture thereof. Specific examples include, but are not limited to, acetic anhydride, phthalic anhydride, succinic anhydride, maleic anhydride, 1,2,4,5-benzene tetracarboxylic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, and dipentyl ether.

The process of solids precipitation may be carried out by at least one of three methods. One method includes mixing a titanium compound such as liquid titanium tetrahalide with a magnesium-based pre-catalyst support crystal lattice at a temperature from about $-40°$ C. to about $0°$ C., and precipitating the solids while the temperature is raised slow from about $30°$ C. to about $120°$ C., such as from about $60°$ C. to about $100°$ C. The second method involves adding a titanium compound drop-wise into a magnesium-based pre-catalyst support crystal lattice at low or room temperature to precipitate out solids immediately. The third method involves adding a first titanium compound drop-wise into a magnesium-based pre-catalyst support crystal lattice and mixing a second titanium compound with the magnesium catalyst support/catalyst crystal lattice. In these methods, a boron-based internal electron donor may be desirably present in the reaction system. A boron-based internal electron donor may be added either after the magnesium-based pre-catalyst support crystal lattice is obtained or after the solid precipitate is formed.

In some embodiments, the solid pre-catalyst component may be granular and/or spherical. In some embodiments, the solid pre-catalyst component may be granular. In some embodiments, the solid pre-catalyst component may be spherical.

In one embodiment, when the solid pre-catalyst component is formed, a surfactant may be used. The surfactant can contribute to many of the beneficial properties of the solid pre-catalyst component and catalyst system. General examples of surfactants include polymer surfactants, such as polyacrylates, polymethacrylates, polyalkyl methacrylates, and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

In one embodiment, non-ionic surfactants and/or anionic surfactants may be used. Examples of non-ionic surfactants and/or anionic surfactants include, but are not limited to, phosphate esters, alkyl sulfonates, aryl sulfonates, alkylaryl sulfonates, linear alkyl benzene sulfonates, alkylphenols, ethoxylated alcohols, carboxylic esters, fatty alcohols, fatty esters, fatty aldehydes, fatty ketones, fatty acid nitrites, benzene, naphthalene, anthracene, succinic anhydride, phthalic anhydrides, rosin, terpene, phenol, or the like. In fact, a number of anhydride surfactants are effective. In some instances, the absence of an anhydride surfactant causes the formation of very small catalyst support particles while the over-use creates straw shaped material sometimes referred to as needles.

The solid pre-catalyst precursor may be formed by the following method. In a solvent such as toluene, a magnesium and titanium containing solution is seen following the addition of a halogenating agent such as $TiCl_4$ into a magnesium-based solution at relatively cooler temperatures, such as −25° C. until about 0° C. An oil phase is then formed, which may be dispersed into the hydrocarbon phase that is stable until about 40° C. The resultant magnesium material becomes a semi-solid at this point and the particle morphology is now determined. The semi-solid converts to a solid between about 40° C. and about 80° C.

To facilitate obtaining uniform solid particles, the process of precipitation may be carried out slowly. When the second method of adding titanium halide drop-wise at low or room temperature is applied, the process may take place over a period from about 1 hour to about 6 hours. When the first method of raising the temperature in a slow manner is applied, the rate of temperature increase can be from about 4° C. to about 125° C. per hour.

The solid precipitate is first separated from the mixture. In the solid precipitate, thus obtained, may be entrained a variety of complexes and byproducts, so that further treatment may in some instances be necessary. In one embodiment, the solid precipitate is treated with a titanium compound to substantially remove the byproducts from the solid precipitate.

The solid precipitate may be washed with an inert diluent and then treated with a titanium compound or a mixture of a titanium compound and an inert diluent. The titanium compound used in this treatment may be identical to or different with the titanium compound used for forming the solid precipitate. The amount of titanium compound used is from about 1 to about 20 moles, such as from about 2 to about 15 moles, per mole of magnesium compound in the support. The treatment temperature is from about 50° C. to about 150° C., such as from about 60° C. to about 100° C. If a mixture of titanium tetrahalide and an inert diluent is used to treat the solid precipitate, the volume % of titanium tetrahalide in the treating solution is from about 10% to about 100%, the rest being the inert diluent.

The treated solids may be further washed with an inert diluent to remove ineffective titanium compounds and other byproducts. The inert diluent herein used may be hexane, heptanes, octane, 1,2-dichloroethane, benzene, toluene, ethylbenzene, xylene, and other hydrocarbons.

By treating the solid precipitate with the titanium compound and optionally an inert diluent, the byproducts in the solid precipitate may be removed from the solid precipitate. In one embodiment, the solid precipitate is treated with the titanium compound and optionally an inert diluent about two times or more and five times or less.

By treating the solid precipitate with an inert diluent, a free titanium compound in the solid precipitate may be removed from the solid precipitate. As a result, the resultant solid precipitate does not substantially contain a free titanium compound. In one embodiment, the solid precipitate is treated repeatedly with an inert diluent until the filtrate contains about 100 ppm or less of titanium. In another embodiment, the solid precipitate is treated repeatedly with an inert diluent until the filtrate contains about 50 ppm or less of titanium. In yet another embodiment, the solid precipitate is treated with an inert diluent until the filtrate contains about 10 ppm or less of titanium. In one embodiment, the solid precipitate is treated with an inert diluent about three times or more and seven times or less.

In one embodiment, the solid pre-catalyst component contains from about 0.5 to about 6.0 wt % titanium; from about 10 to about 25 wt % magnesium; from about 40 to about 70 wt % halogen; from about 1 to about 50 wt % of a boron-based internal electron donor; and optionally an inert diluent from about 0 to about 15 wt %. In another embodiment, the solid pre-catalyst component contains from about 2 to about 25 wt % of the boron-based internal electron donor. In yet another embodiment, the solid pre-catalyst component contains from about 5 to about 20 wt % of the boron-based internal electron donor.

The amounts of the ingredients used in preparing the solid pre-catalyst component may vary depending upon the method of preparation. In one embodiment, from about 0.01 to about 5 moles of the boron-based internal electron donor and from about 0.01 to about 500 moles of the titanium compounds are used per mole of the magnesium compound used to make the solid pre-catalyst component. In another embodiment, from about 0.05 to about 2 moles of the boron-based internal electron donor of Formula (I) and from about 0.05 to about 300 moles of the titanium compounds are used per mole of the magnesium compound used to make the solid catalyst component.

In one embodiment, in the solid pre-catalyst component, the atomic ratio of halogen/titanium is from about 4 to about 200; the boron-based internal electron donor/titanium mole ratio is from about 0.01 to about 10; and the magnesium/titanium atomic ratio is from about 1 to about 100. In another embodiment, in the solid pre-catalyst component, the atomic ratio of halogen/titanium is from about 5 to about 100; the boron-based internal electron donor/titanium mole ratio is from about 0.2 to about 6; and the magnesium/titanium atomic ratio is from about 2 to about 50.

The resulting solid pre-catalyst component generally contains a magnesium halide of a smaller crystal size than commercial magnesium halides and usually has a specific surface area of at least about 5 $m^2/g$, such as from about 10 to about 1,000 $m^2/g$, or from about 100 to about 800 $m^2/g$. Surface area may be measured according to the B.E.T. method. Since the above ingredients are unified to form an integral structure of the solid pre-catalyst component, the composition of the solid pre-catalyst component does not substantially change by washing with, for example, hexane.

The solid pre-catalyst component may be used after being in contact with an inorganic or organic compound such as a silicon- or boron-based compound, an aluminum compound, or the like.

The catalyst system may contain at least one organoaluminum compound in addition to the solid pre-catalyst component. Compounds having at least one aluminum-carbon bond in the molecule may be used as the organoaluminum compound. Examples of organoaluminum compounds include compounds of the following chemical formula (III): $AlR^{80}{}_nX_{3-n}$(IX). In Formula (IX), $R^{80}$ is a hydrocarbon group usually having 1 to about 20 carbon atoms, X represents halogen atoms, and n is greater than 0, up to, and including, 3. In some embodiments, $R^{80}$ is a $C_1$-$C_{20}$ alkyl. In other embodiments, X is Cl.

Specific examples of the organoaluminum compounds represented by formula (IX) include, but are not limited to, trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound may be used in the catalyst system in an amount where the mole ratio of aluminum to titanium (from the solid pre-catalyst component) is from about 5 to about 1,000. In another embodiment, the mole ratio of aluminum to titanium in the catalyst system may be from about 10 to about 700. In yet another embodiment, the mole ratio of aluminum to titanium in the catalyst system may be from about 25 to about 400.

The catalyst system may contain at least one external electron donor compound in addition to the solid pre-catalyst and the organoalumium components. The external electron donor may be an organosilicon compound which contains silicon and having at least one hydrocarbyl group, or a boron-based compound. General examples of hydrocarbyl groups include alkyl groups, cycloalkyl groups, (cycloalkyl)methylene groups, alkene groups, aromatic groups, and the like.

The organosilicon or boron-based compound, when used as an external electron donor serving as one component of a Ziegler-Natta catalyst system for olefin polymerization, contributes to the ability to obtain a polymer (at least a portion of which is polyolefin) having a controllable molecular weight distribution and controllable crystallinity while retaining high performance with respect to catalytic activity. In any of the catalyst systems described herein, the system may use any conventional internal donors and the boron-based compounds, described herein as either internal or external donors, may be used as external electron donors.

The organosilicon or boron-based compounds are used in the catalyst system in an amount such that the mole ratio of the organoaluminum compound to the organosilicon or boron-based compounds is from about 1 to about 200. In some embodiments, the mole ratio of the organoaluminum compound to the organosilicon or boron-based compounds is about 1 to about 100. In some embodiments, the mole ratio of the organoaluminum compound to the organosilicon or boron-based compounds is about 2 to about 90. In some embodiments, the mole ratio of the organoaluminum compound to the organosilicon or boron-based compounds is from about 5 to about 70. In some embodiments, the mole ratio of the organoaluminum compound to the organosilicon or boron-based compounds is about 1 to about 60. In yet another embodiment, the mole ratio of the organoaluminum compound to the organosilicon or boron-based compounds is from about 7 to about 35.

In various embodiments the organosilicon compound may be represented by chemical formula (X): $R^{81}{}_{n'}Si(OR^{82})_{4-n'}$, (X) wherein each $R^{81}$ and $R^{82}$ independently represent a hydrocarbon group, and n' is an integer from 0 to 3.

Specific examples of the organosilicon compound of formula (X) include, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane.

In another embodiment, the organosilicon compound is represented by chemical Formula (XI): $SiR^{81}{}_{m}R^{83}{}_{n}(OR^{82})_{3-(m+n)}$(XI). In Formula (XI), n is 1, 2, or 3, m is 0, 1, or 2; each $R^{81}$ and $R^{82}$ independently represent a hydrocarbon group; and $R^{83}$ represents a cyclic hydrocarbon or substituted cyclic hydrocarbon group. Illustrative examples of $R^{83}$ include, but are not limited to, cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In Formula (XI), $R^{81}$ and $R^{82}$ are identical or different and each represents a hydrocarbon. Illustrative examples of $R^{81}$ and $R^{82}$ include alkyl, cycloalkyl, aryl and aralkyl groups having 3 or more carbon atoms. Furthermore, $R^{81}$ and $R^{82}$ may be bridged by an alkyl group, etc. General examples of organosilicon compounds are those of Formula (XI) in which $R^{83}$ is cyclopentyl group, and $R^{81}$ and $R^{82}$ are alkyl groups such as methyl groups.

Specific examples of organosilicon compound of Formula (XI) include, but are not limited to, trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis (2-methylcyclopentyl)dimethoxysilane, bis(3-tertiary butyl-cyclopentyl)dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis (1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfiuorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

In various embodiments the boron-based compound may be represented by chemical formula(I): $B(OR^1)R^2R^3$. In Formula (I), each $R^1$ is individually H, linear or branched alkyl, cycloalkyl, aryl, heterocyclyl, or heteroaryl, any of which may be optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof. $R^2$ and $R^3$ are individually linear or branched alkyl, cycloalkyl, aryl, heterocyclyl, heteroaryl, each of which may be optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; or $OR^1$, or $R^2$ and $R^3$ may join together and with the boron atom form a borinane ring. In some embodiments of Formula (I), each $R^1$ may be individually $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, $R^2$ may be $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, or $OR^1$, and $R^3$ may be $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, or $OR^1$. In any of the above embodiments, where "alkyl" is used, it may be a straight or branched chain alkyl. In any of the above embodiments of Formula (I), each $R^1$ may be methyl, ethyl, n-propyl, isopropyl, n-butyl, sec-butyl, tert-butyl, n-pentyl, sec-pentyl, neo-pentyl, cyclohexyl, phenyl, naphthyl, anthracenyl, or an alkylated, arylated, or substituted group thereof. In any of the above embodiments of Formula (I), $R^2$ and $R^3$ may be individually $C_1$-$C_8$ alkyl, $C_3$-$C_{12}$ cycloalkyl, $C_5$-$C_{12}$ aryl, or $OR^1$. In any of the above embodiments of Formula (I), $R^2$ and $R^3$ may be individually $C_1$-$C_8$ alkyl or $OR^1$.

Illustrative boron-based external electron donors include, but are not limited to, trimethyl borate, triethyl borate, tri-n-propyl borate, tri-n-butyl borate, dimethyl phenylboronate, diphenyl methylboronate, diphenyl ethylboronate, diphenyl n-propylboronate, diphenyl isopropylboronate, triphenyl borate, diethyl 1-phenylethyl borate, diethyl phenylboronate, diethyl-(3,5-di-tert-butylphenyl)boronate, dimethyl-[1,1'-biphenyl]-3-yl-boronate, dimethyl naphthalene-1-yl-boronate, dimethyl cyclohexylboronate, diethyl cyclohexylboronate, dimethyl cyclopentylboronate, diethyl cyclopenthylboronate, dimethyl (furan-2-yl)boronate, diethyl (furan-2-yl)boronate, methyl ethyl (furan-2-yl)boronate, dimethyl (thien-2-yl)boronate, diethyl (thien-2-yl)boronate, or ethyl methyl (thien-2-yl)boronate.

Polymerization of olefins may be carried out in the presence of any of the catalyst systems described herein. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of co-polymer is carried out using at least two polymerization zones.

In preliminary polymerization, the solid pre-catalyst component is usually employed in combination with at least a portion of the organoaluminum compound. This may be carried out in the presence of part or the whole of the organosilicon compound (external electron donor). The concentration of the catalyst system used in the preliminary polymerization may be much higher than that in the reaction system of the main polymerization.

In preliminary polymerization, the concentration of the solid pre-catalyst component in the preliminary polymerization is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Specific, non-limiting, examples of the inert hydrocarbon medium include, but are not limited to, aliphatic hydrocarbons such as propane, butane, pentane, hexane, heptanes, octane, decane, dodecane and kerosene; alicyclic hydrocarbons such as cyclopentane, cyclohexane and methylcyclopentane; aromatic hydrocarbons such as benzene, toluene and xylene; and mixtures thereof. A liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient to produce polymer particles without the formation of fines. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer is formed per gram of the solid pre-catalyst component of the catalyst system. In another embodiment, the preliminary polymerization is desirably carried out so that from about 0.3 g to about 500 g of a polymer is formed per gram of the solid pre-catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid pre-catalyst component, the organoaluminum compound and the organosilicon compound (external electron donor).

Examples of olefins that may be used in the main polymerization are α-olefins having 2 to 20 carbon atoms such as ethylene, propylene, 1-butene, 4-methyl-1-pentene, 1-pentene, 1-octene, 1-hexene, 1-octene, 3-methyl-1-pentene, 3-methyl-1-butene, 1-decene, 1-tetradecene, 1-eicosene, and vinylcyclohexane. In the process, these α-olefins may be used individually or in any combination. In some embodiments the olefin may be ethylene, propylene, or mixtures thereof. In some embodiments, the olefin may be ethylene. In some embodiments, the olefin may be propylene.

The polymerization of the olefin monomers may be carried out using a mixture of olefin monomers to form co-polymers. Such co-polymers may be random co-polymers by the copolymerizing two alpha olefins such as propylene and ethylene, terpolymers by copolymerizing three alpha olefins such as propylene, ethylene, and butene, or impact co-polymers by sequential copolymerization of propylene with ethylene or other olefin in reactor to produce well dispersed heterophasic morphology of rubber domains embedded in a semicrystalline homo-polymer matrix.

In one embodiment, propylene or 1-butene is homopolymerized, or a mixed olefin containing propylene or 1-butene as a main component is co-polymerized. When the mixed olefin is used, the proportion of propylene or 1-butene as the main component is usually at least about 50 mole %, preferably at least about 70 mole %.

By performing the preliminary polymerization, the catalyst system in the main polymerization may be adjusted in the degree of activity. This adjustment tends to result in a powdery polymer having a high bulk density. Furthermore, when the preliminary polymerization is carried out, the particle initial shape is better retained throughout the polymerization process, and in the case of slurry polymerization, the slurry attains excellent characteristics while in the case of gas phase polymerization, the polymer seed bed attains excellent characteristics. Furthermore, in these embodiments, a polymer having a high stereoregularity index may be produced with a high catalytic efficiency by polymerizing an α-olefin having at least 3 carbon atoms. Accordingly, when producing the propylene co-polymer, the resulting co-polymer powder or the co-polymer becomes easy to handle.

In the homopolymerization of these olefins, a polyunsaturated compound such as conjugated diene or non-conjugated diene may be used as a co-monomer. Examples of co-monomers include styrene, butadiene, acrylonitrile, acrylamide, α-methyl styrene, chlorostyrene, vinyl toluene, divinyl benzene, diallylphthalate, alkyl methacrylates and alkyl acrylates. In one embodiment, the co-monomers include thermoplastic and elastomeric monomers.

The polymerization of an olefin is carried out usually in the gaseous or liquid phase. In one embodiment, polymerization (main polymerization) employs a catalyst system containing the solid pre-catalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid pre-catalyst component, and the organosilicon compound in an amount from about 0.001 to about 10 moles calculated as Si atoms in the organosilicon compound per mole of the metal atoms in the organoaluminum compound. In another embodiment, polymerization employs a catalyst system containing the solid pre-catalyst component in an amount of from 0.005 to about 0.5 millimoles calculated as Ti atom per liter of the volume of the polymerization zone, the organoaluminum compound in an amount from about 5 to about 500 moles per mole of titanium atoms in the solid catalyst component, and the organosilicon or boron-based compounds in an amount from about 0.01 to about 2 moles calculated as Si atoms in the organosilicon or B atoms in the boron-based compound per mole of the metal atoms in the organoaluminum compound. In yet another embodiment, polymerization employs a catalyst system containing the alkyl benzoate derivative in an amount from about 0.005 to about 1 mole calculated as Si or B atoms in the organosilicon or boron-based compounds, respectively, per mole of the metal atoms in the organoaluminum compound.

When the organoaluminum compound and the organosilicon or boron-based compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are generally influenced as well.

In one embodiment, the polymerization temperature is from about 20° C. to about 200° C. In another embodiment, the polymerization temperature is from about 50° C. to about 180° C. In one embodiment, the polymerization pressure is typically from atmospheric pressure to about 100 kg/cm$^2$. In another embodiment, the polymerization pressure is typically from about 2 kg/cm$^2$ to about 50 kg/cm$^2$. The main polymerization may be carried out batchwise, semi-continuously or continuously. The polymerization may also be carried out in two or more stages under different reaction conditions.

The olefin polymer so obtained may be a homopolymer, a random co-polymer, a block co-polymer or an impact co-polymer. The impact co-polymer contains an intimate mixture of a polyolefin homopolymer and a polyolefin rubber. Examples of polyolefin rubbers include ethylene propylene rubber (EPR) such as ethylene propylene methylene co-polymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the co-polyolefin obtained has a narrow composition distribution. In an impact co-polymer, excellent fluidity, low temperature resistance, and a desired balance between stiffness and elasticity may be obtained.

In one embodiment, propylene and an α-olefin having 2 or from about 4 to about 20 carbon atoms are co-polymerized in the presence of the catalyst system described above. The catalyst system may be one subjected to the preliminary polymerization described above. In another embodiment, propylene and an ethylene rubber are formed in two or more reactors coupled in series to form an impact polymer.

The α-olefin having 2 carbon atoms is ethylene, and examples of the α-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be co-polymerized with two or more such α-olefins. For example, it is possible to co-polymerize propylene with ethylene and 1-butene. In one embodiment, propylene is co-polymerized with ethylene, 1-butene or ethylene and 1-butene.

In one embodiment, the polymerization in a second stage is desirably carried out such that the mole ratio of propylene to the other α-olefin(s) is from about 10/90 to about 90/10. In another embodiment, the polymerization in a second stage is desirably carried out such that the mole ratio of propylene to the other α-olefin(s) is from about 20/80 to about 80/20. In yet another embodiment, the polymerization in a second stage is desirably carried out such that the mole ratio of propylene to the other α-olefin(s) is from about 30/70 to about 70/30. Producing a crystalline polymer or co-polymer of another α-olefin may be provided in the second polymerization stage.

The propylene and ethylene co-polymer obtained may be a random co-polymer with different levels of ethylene-propylene sequences within the polymer chain. This propylene co-polymer typically contains from about 7 to about 50 mole % of units derived from the α-olefin having 2 or from about 4 to about 20 carbon atoms. In one embodiment, a propylene random co-polymer contains from about 7 to about 20 mole % of units derived from the α-olefin having 2 or from about 4 to about 20 carbon atoms. In another embodiment, the propylene block co-polymer contains from about 10 to about 50 mole % of units derived from the α-olefin having 2 or 4-20 carbon atoms.

In another embodiment, co-polymers made with the catalyst system contain from about 50% to about 99% by weight poly-α-olefins and from about 1% to about 50% by weight co-monomers (such as thermoplastic or elastomeric monomers). In another embodiment, co-polymers made with the catalyst system contain from about 75% to about 98% by weight poly-α-olefins and from about 2% to about 25% by weight co-monomers.

It should be understood that where there is no reference to the polyunsaturated compound that may be used, the method of polymerization, the amount of the catalyst system and the polymerization conditions, the same description as the above embodiment are applicable.

The catalysts/methods may, in some instances, lead to the production of homopolymerized poly-α-olefins having xylene soluble (XS) from about 0.5% to about 12%. In another embodiment, homopolymerized poly-α-olefins having xylene soluble (XS) from about 2% to about 10% are produced. XS refers to the percent of solid polymer that dissolves into xylene, according to the ASTM D5492. A low XS % value generally corresponds to a highly isotactic homopolymer (i.e. higher crystallinity), whereas a high XS % value generally corresponds to a low isotactic polymer.

In one embodiment, the catalyst efficiency in bulk slurry polymerization (measured as kilogram of polymer produced per gram of pre-catalyst) of the catalyst system is at least about 25. In another embodiment, the catalyst efficiency of the catalyst system is at least about 30.

The catalysts under some polymerization conditions may in some instances lead to the production of poly-α-olefins having melt flow indexes (MFI) from about 0.1 to about 500. The MFI is measured according to ASTM standard D1238. In another embodiment, poly-α-olefins having an MFI from about 1 to about 100 are produced. In one embodiment, an impact polypropylene-co-ethylene-propylene rubber product has an MFI from about 0.1 to about 150. In another embodiment, an impact polypropylene-co-ethylene-propylene rubber product has an MFI from about 1 to about 100. In some instances a relatively high MFI indicates relatively higher catalyst efficiency is obtainable.

The catalysts/methods may in some instances lead to the production of poly-α-olefins having bulk densities (BD) of at least about 0.3 cc/g. In another embodiment, poly-α-olefins having a BD of at least about 0.35 cc/g are produced.

In one embodiment, an impact polypropylene-co-ethylene-propylene rubber product having a BD of at least about 0.3 cc/g is produced. In another embodiment, an impact polypropylene-ethylenepropylene rubber product having a BD of at least about 0.35 cc/g is produced.

The catalysts/methods lead to the production of poly-α-olefins having a relatively narrow molecular weight distribution. Polydispersity Index (PI) is strictly connected with the molecular weight distribution of the polymer. PI is obtained from plotting the crossover of shear storage modulus (G') to loss modulus (G"). In one embodiment, the PI of a polypropylene polymer made with the catalyst system is from about 2 to about 12. In another embodiment, the PI of a polypropylene polymer made with the catalyst system is from about 4 to about 11.

Propylene random co-polymers and impact co-polymers may be prepared by the present methods, including the preparation of polypropylene-based impact co-polymers having one or more enhanced properties in melt-flowability, moldability desirable balance between rigidity and elasticity, good stereospecific control, good control over polymer particle size, shape, size distribution, and molecular weight distribution, and impact strength with a high catalytic efficiency and/or good operability. Employing the catalyst systems containing the solid catalyst component yields catalysts simultaneously having high catalytic efficiency, and one or more of excellent melt-flowability, extrudability, moldability, rigidity-elasticity and impact strength.

In another aspect, any of the above boron-based compounds may be used as an external donor for the preparation of a catalyst system for olefin polymerization. Other non-boron-based internal donors are known and are widely employed in olefin polymerization catalysts. As noted above, external donors may also be employed in the catalysts and the boron-based materials may be used in such a context.

The present invention, thus generally described, will be understood more readily by reference to the following examples, which are provided by way of illustration and are not intended to be limiting of the present invention.

EXAMPLES

General.

Illustrative compounds used as boron-based internal electron donors are shown in Table 1.

TABLE 1

| Boron-based Internal Electron Donors | |
|---|---|
| Donor Number | Structure |
| 1 | 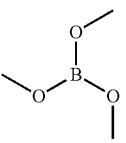<br>trimethyl borate |
| 2 | 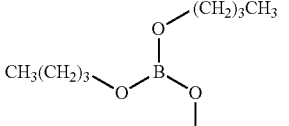<br>tributyl borate |
| 3 | 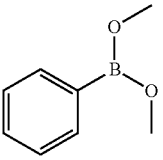<br>dimethyl phenylboronate |
| 4 | 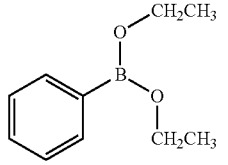<br>diethyl phenylboronate |
| 5 | 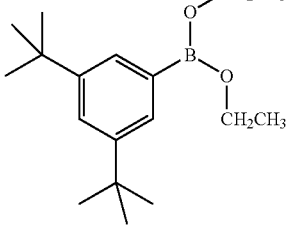<br>diethyl (3,5-di-tert-butylphenyl)boronate |
| 6 | 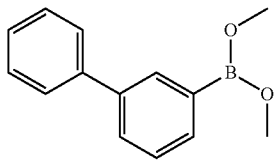<br>dimethyl [1,1'-biphenyl]-3-ylboronate |

TABLE 1-continued

| Boron-based Internal Electron Donors | |
|---|---|
| Donor Number | Structure |
| 7 | 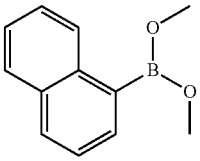<br>dimethyl naphthalen-1-ylboronate |
| 8 | 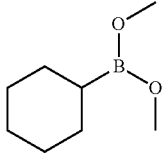<br>dimethyl cyclohexylboronate |
| 9 | 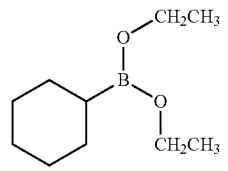<br>diethyl cyclohexylboronate |

Synthesis.

Example 1

Preparation of dimethylphenylboronate (Donor 3). Electron donor 3 was prepared as shown in Scheme 1. A round bottom flask was charged with phenylboronic acid (2.4 g; 20 mmol), trimethyl orthoformate (5.5 mL; 50 mmol), and trifluoracetic acid (0.2 mL). The reaction was carried out at room temperature for 15 minutes. Following removal of the volatiles under reduced pressure, the resulting liquid was distilled to obtain approximately 2.0 g (13.3 mmol) of the electron donor 3 as a colorless liquid.

Scheme 1:

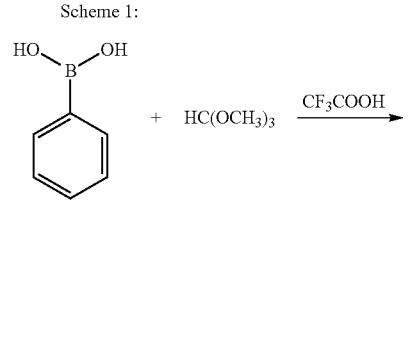

Example 2

Preparation of diethylphenylboronate (Donor 4). Electron donor 4 was prepared as shown in Scheme 2. A round bottom flask was charged with phenylboronic acid (3.6 g; 30 mmol), triethyl orthoformate (12. mL; 75 mmol), and trifluoracetic acid (0.2 mL). The reaction was carried out at room temperature for 15 minutes. Following removal of the volatiles under reduced pressure, the resulting liquid was distilled to obtain approximately 2.0 g (11.2 mmol) of the electron donor 4 as a colorless liquid.

Scheme 2:

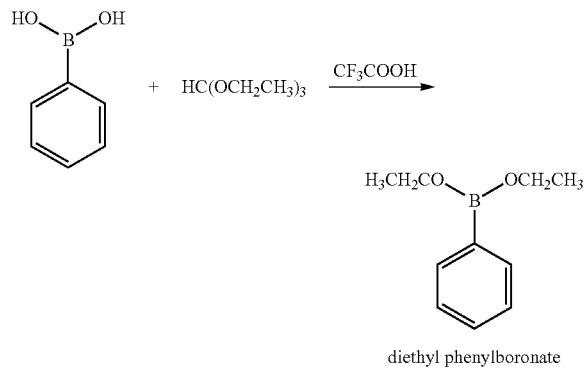

diethyl phenylboronate

Example 3

Preparation of diethyl-(3,5-di-tert-butylphenyl)boronate (Donor 5). Electron donor 5 was prepared as shown in Scheme 3. A Schelenk tube was charged with 3,5-di-tert-butylbromobenzene (2.1 g; 7.9 mmol) in 20 ml of THF and cooled to −78° C. A solution of n-BuLi in hexane (1.6 M; 8.5 mL) was added dropwised to the solution. After complete addition, the resulting mixture was stirred for 30 minutes at the same temperature followed by the dropwise addition of pre-cooled trimethoxyborate to the solution. The reaction was then allowed to warm to room temperature, and after an additional 30 minutes, the reaction was quenched with the addition of water (50 mL). After workup, the intermediate 3,5-di-tert-butylphenylboronic acid was obtained as a white solid. This material (0.4 g; 4 mmol) was then charged to a flask with triethyl orthoformate (1.1 mL; 10 mmol) and trifluoracetic acid (0.1 mL). The reaction was carried out at room temperature for 60 minutes. Following removal of the volatiles under reduced pressure, the resulting liquid was distilled to obtain electron donor 5 as a colorless liquid.

Scheme 3:

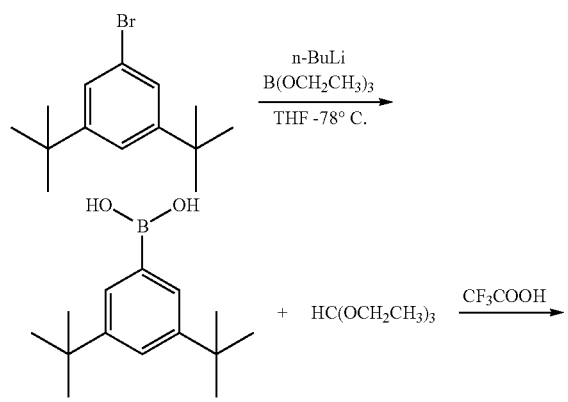

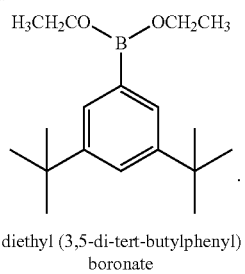

diethyl (3,5-di-tert-butylphenyl) boronate

Example 4

Preparation of dimethyl(1,1'-biphenyl)-3-ylboronate (Donor 6). Electron donor 6 was prepared as shown in Scheme 4. A round bottom flask was charged with 3-biphenylboronic acid (1.0 g; 5.0 mmol), trimethyl orthoformate (2.8 mL; 15 mmol), and trifluoracetic acid (0.1 mL). The reaction was carried out at room temperature for 15 minutes. Following removal of the volatiles under reduced pressure, the resulting liquid was distilled to obtain approximately 1.4 g (6.2 mmol) of the electron donor 6 as a dark brown liquid.

Scheme 4:

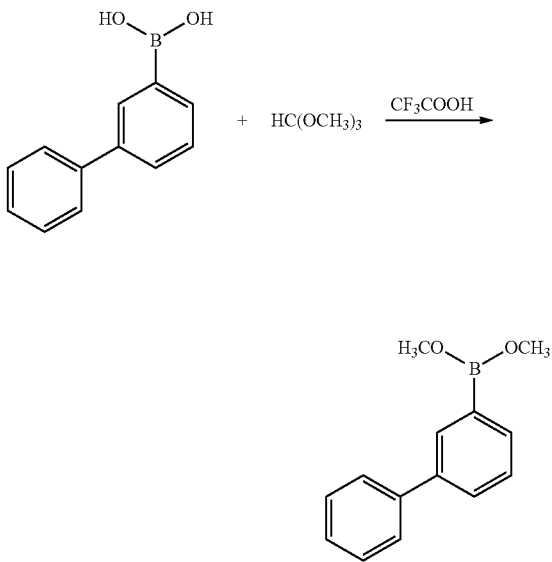

dimethyl [1,1'-biphenyl]-3-ylboronate

Example 5

Preparation of dimethyl naphthalen-1-ylboronate (Donor 7). Electron donor 7 was prepared as shown in Scheme 5. A round bottom flask was charged with 1-naphthylboronic acid (1.0 g; 5.8 mmol), trimethyl orthoformate (2.8 mL; 15 mmol), and trifluoracetic acid (0.1 mL). The reaction was carried out at room temperature for 15 minutes. Following removal of the volatiles under reduced pressure, the resulting liquid was distilled to obtain approximately 2.1 g (10.5 mmol) of the electron donor 7 as a brownish liquid.

Scheme 5:

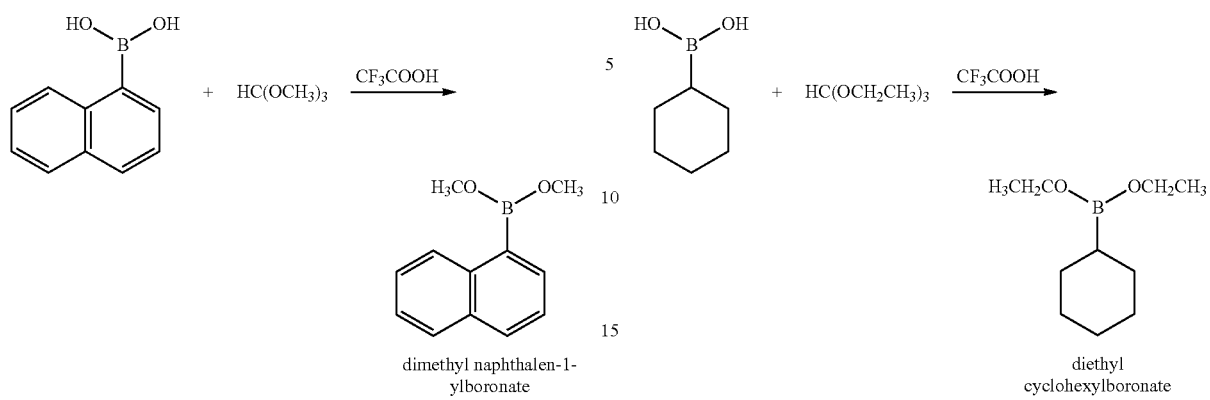

dimethyl naphthalen-1-ylboronate

Scheme 7:

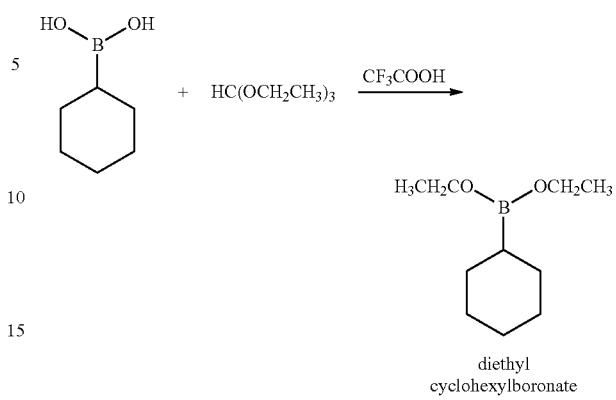

diethyl cyclohexylboronate

Pre-Catalysts

Example 6

Preparation of dimethylcyclohexylboronate (Donor 8). Electron donor 8 was prepared as shown in Scheme 6. A round bottom flask was charged with cyclohexylboronic acid (2.6 g; 20 mmol), trimethyl orthoformate (5.5 mL; 50 mmol), and trifluoracetic acid (0.2 mL). The reaction was carried out at room temperature for 60 minutes. Following removal of the volatiles under reduced pressure, the resulting liquid was distilled to obtain approximately 1.4 g (9.0 mmol) of the electron donor 8 as a colorless liquid.

Scheme 6:

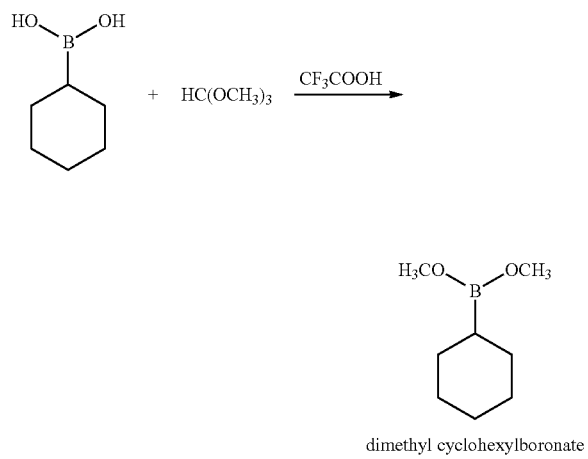

dimethyl cyclohexylboronate

Example 7

Preparation of diethylcyclohexylboronate (Donor 9). Electron donor 9 was prepared as shown in Scheme 7. A round bottom flask was charged with cyclohexylboronic acid (2.6 g; 20 mmol), triethyl orthoformate (8.3 mL; 50 mmol), and trifluoracetic acid (0.2 mL). The reaction was carried out at room temperature for 60 minutes. Following removal of the volatiles under reduced pressure, the resulting liquid was distilled to obtain approximately 2.5 g (13.6 mmol) of the electron donor 9 as a colorless liquid.

Example 8

Preparation of solid pre-catalyst component using electron donors of the present technology. Solid pre-catalyst components as described in the present technology are prepared using the general methods described herein and the exemplary electron donors of formula (I). 3.3 g $MgCl_2$, 0.8 g phthalic anhydride, 6.41 g epichlorohydrin, 6.70 g tributylphosphate, and 50.92 g toluene were charged to a 250 ml reactor under nitrogen. The mixture was heated to 60° C. and agitated at 400 rpm for 2 hours. The mixture was then cooled to −30° C. and 65 g $TiCl_4$ were added while maintaining the reactor at −25° C. during the addition. The agitation was reduced to 200 rpm and the reactor was heated to 85° C. over two hours. After reaching temperature, the agitation was increased to 400 rpm for 30 minutes, and 0.6 g of donor (I) was added and stirred for one hour, followed by filtration. Toluene (38 ml) and 0.4 g of donor (I) were added to the reactor and the mixture was heated to 85° C. at 400 rpm, stirred for one hour, and filtered. The heat was turned off, and the mixture was washed with 65 ml toluene and filtered. Another 65 ml toluene was added and the mixture was held under nitrogen overnight without stirring. The toluene was removed by filtering, and 66.25 ml of 10% wt $TiCl_4$-toluene was added prior to heating the mixture to 95° C. with stirring at 400 rpm for one hour, followed by filtration. The previous step was repeated 3 times at 110° C., 400 rpm, and 30 minute each. The final pre-catalyst was washed 4 times with 65 ml hexane and collected as a hexane slurry.

Example 9

Illustrative polymerization with Electron Donors. The prepared pre-catalysts were used for propylene polymerization conditions using the following exemplary procedure. Propylene polymerization was performed in a one gallon reactor. The reactor was purged at 100° C. under nitrogen for one hour. At room temperature, 1.5 ml of 25 wt % TEA1 (triethylaluminum) in heptane was added into the reactor. Next, 0.94 ml of 0.0768 M solution of cyclohexyl methyl dimethoxy silane (donor C) was added into the reactor followed by 7.0 mg pre-catalyst as 1 wt % hexane slurry. The reactor was charged with 5 standard liter $H_2$ followed by 1300 g propylene. The reactor was heated to 70° C. and held at at that temperature for one hour. The polymerization was quenched by venting the reactor and the polymer was recovered.

TABLE 2

Pre-catalyst performance results using the internal electron donor of Table 1.

| Donor Number | CE[1] (Kg/g) | XS[2] (%) | MFI[3] (g/10 min) | PI[4] |
|---|---|---|---|---|
| 1 | 31.8 | 6.85 | 10.9 | N/A |
| 2 | 29 (PI) | 9.3 | 10.7 | N/A |
|   | 20 | 11.5 | 16.4 | N/A |
| 3 | 34 (PI) | 10.4 | 13.1 | N/A |
|   | 38.4 (PI) | N/A | N/A | N/A |
| 4 | 27.2 (PI) | 9.5 | 17.3 | N/A |
|   | 26.7 (PI) | N/A | N/A | N/A |
| 5 | 37.9 | N/A | N/A | N/A |
| 6 | 29.0 (PI) | N/A | N/A | N/A |
|   | 28.2 (PI) | N/A | 16.4 | N/A |
| 7 | 24.6 | 8.8 | 18.6 | N/A |
| 8 | 32 (PI) | 10.9 | 18.3 | N/A |
|   | 26.9 (PI) | 7.7 | 15.9 | N/A |
| 9 | 27.9 | N/A | N/A | N/A |

[1]CE is an abbreviation for Catalyst Activity in units of (kg of polymer)/g pre-catalyst/hour).
[2]XS is an abbreviation for Xylene Soluble (a wt % of the product polymer that is soluble in xylene).
[3]MFI is an abbreviation for Melt Flow Index in units of (g polymer/10 min).
[4]PI is an abbreviation for Polydispersity Index.

Example 10

Figure 2:
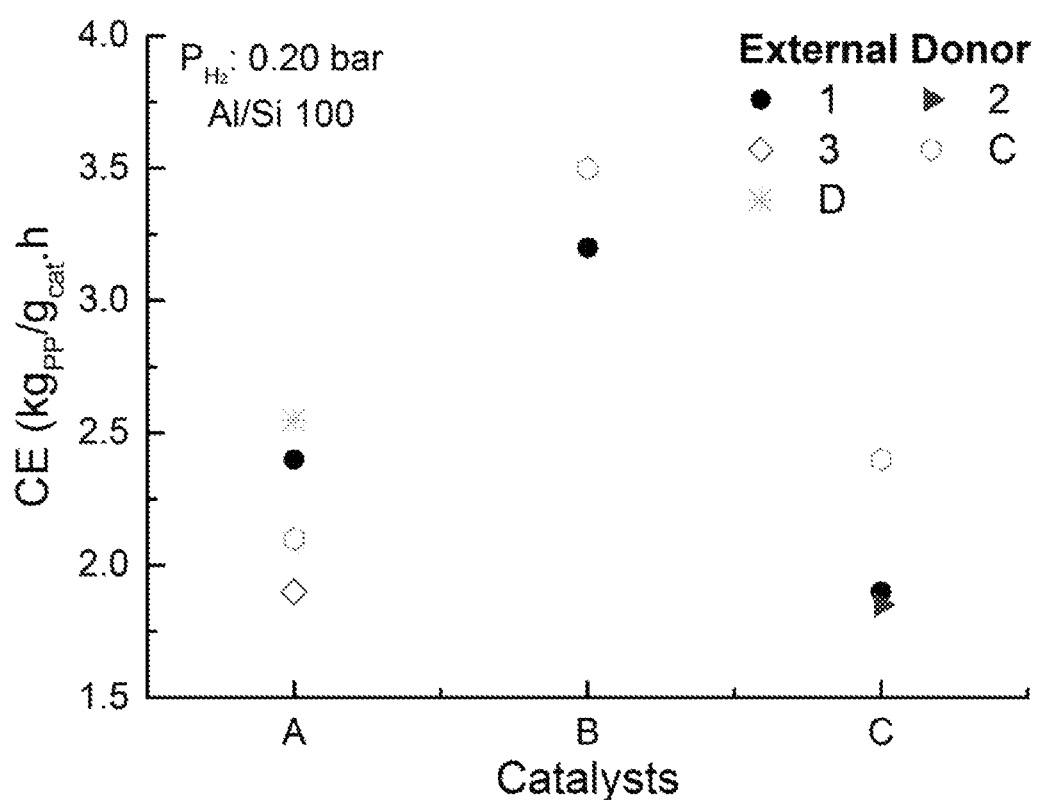
FIG. 2 provides a graph describing the influence of the external donors in presence of different catalyst systems in terms of catalyst efficiency, based upon the results of Examples 10-12.
Figure 3:
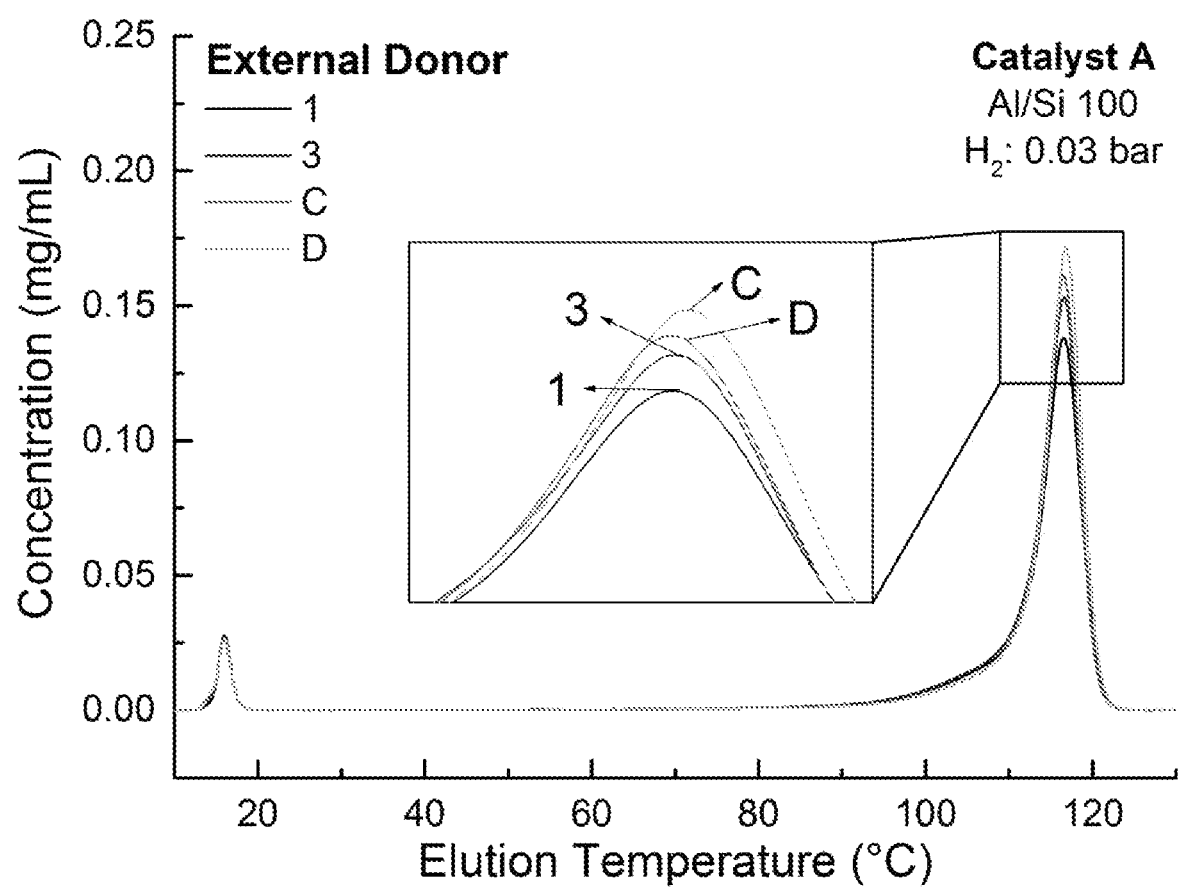
FIG. 3 is a collection of Crystallization Elution Fractionation (CEF) curves of homo-polypropylene samples produced by a ZN catalyst system containing a dibenzofuran (DBF)-based internal electron donor (Catalyst A), and organosilicon- or boron-based external electron donors.
Figure 4:
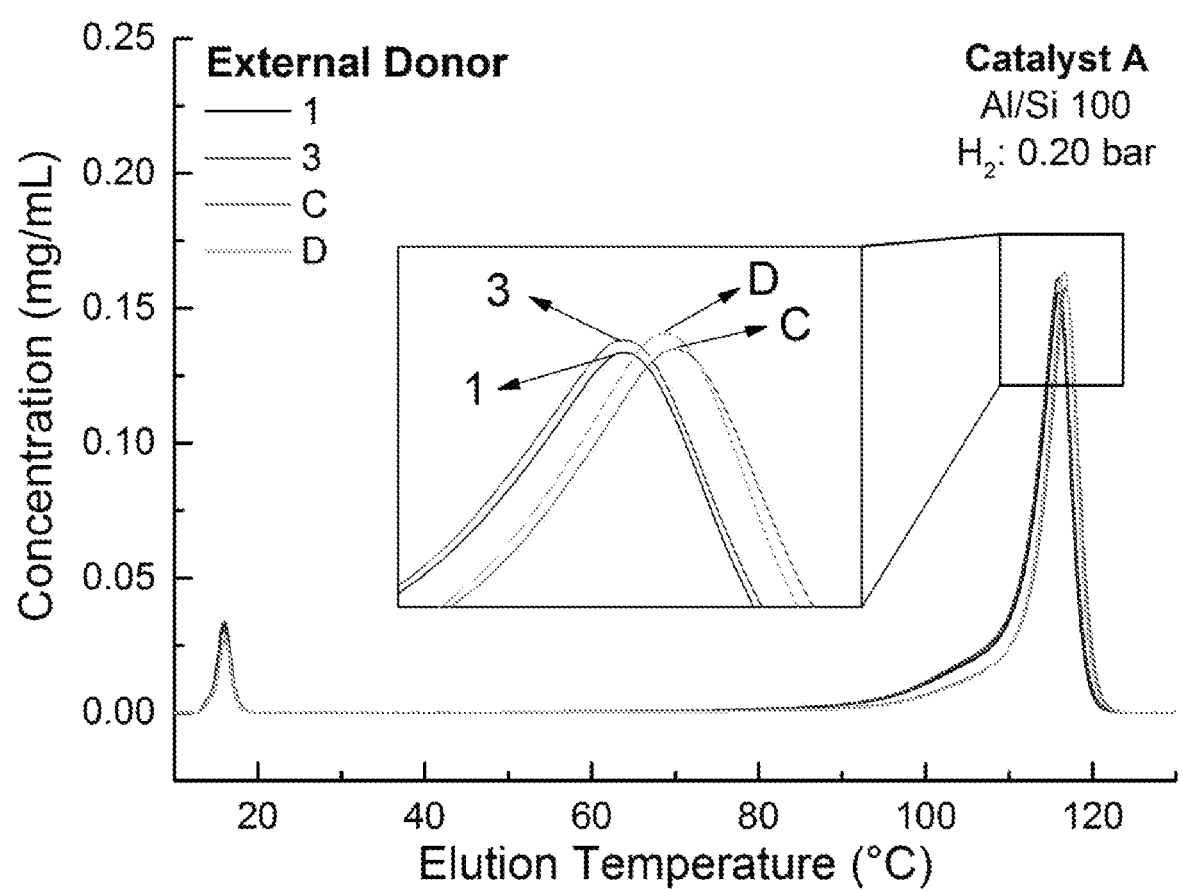
FIG. 4 is a collection of CEF curves of homo-polypropylene samples produced by a ZN catalyst system containing a DBF-based internal electron donor (Catalyst A), and organosilicon- or boron-based external electron donors.
Figure 5:
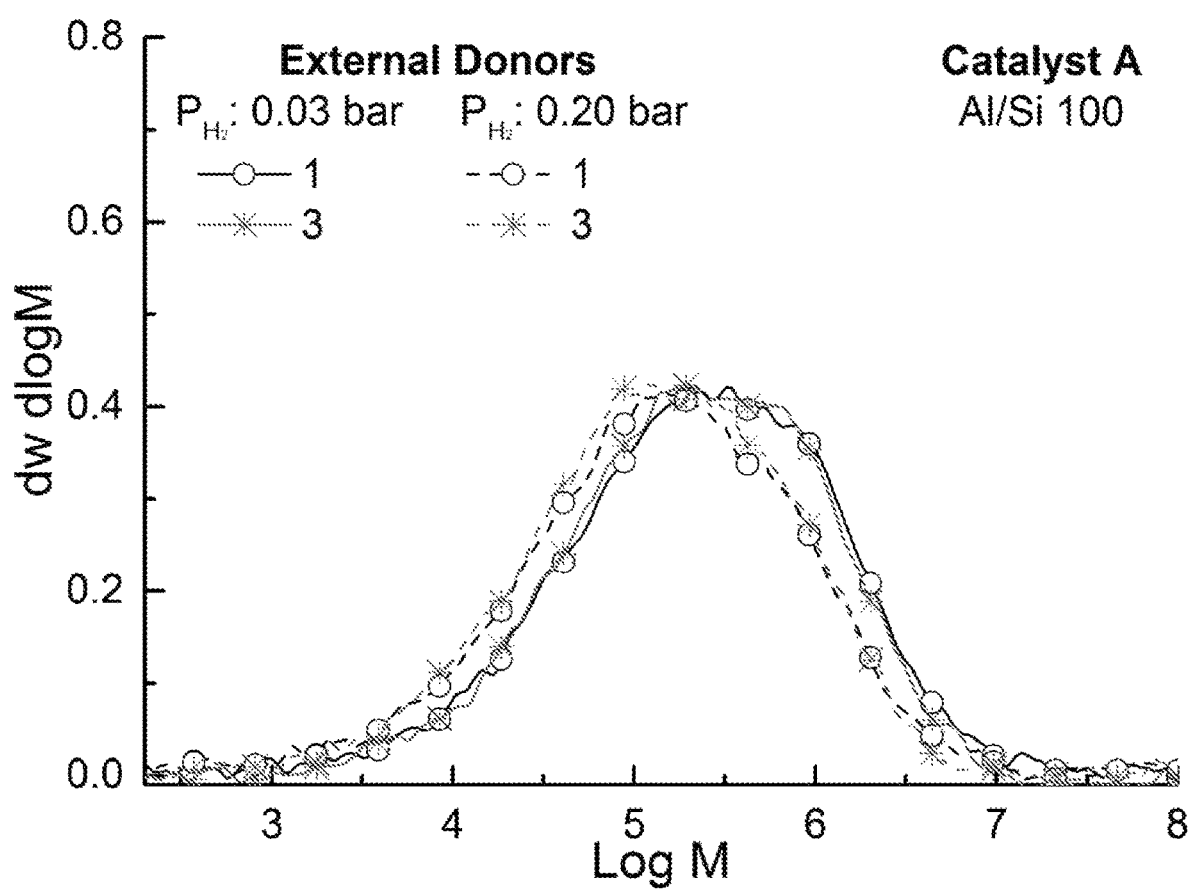
FIG. 5 is a collection of High Temperature Size Exclusion Chromatography (HSEC) curves of homopolypropylene samples produced by a ZN catalyst system containing a DBF-based internal electron donor (Catalyst A), and boron-based external electron donors.

The use of boron- and organosilicon-based compounds as external donors with Catalyst A (DBF-based internal donor 37 as disclosed in WO 2017/204811 A1). A general polymerization procedure is carried out in a reactor cell with a geometric volume of approximately 23 mL and a working volume of approximately 5 mL for the liquid phase equipped with magnetically coupled mechanical stirrer. The cell is initially purged under intermittent nitrogen flow at 90 to 140° C. for 8 hours. After then cooling to room temperature the cell is fitted with disposable 10 mL glass and stir paddles and the stir tops are then set back in the reactor system. The amount of dried heptane is then fed through a syringe pump to the reactor system with the presence of small amounts of triethylaluminum (TEA1) as a scavenger and $H_2$ (p$H_2$ varies from 0.03-0.2 bar) at a temperature of 70° C. and operating pressure with propene (total reactor pressure is 5.5 bar). Under this condition using a slurry needle system the amount of Catalyst A in heptane slurry (approx. 0.1 mg). A solution of TEA1/external donor boron-based, cyclohexyl (dimethoxy)methyl silane (Donor C), and/or dicyclopentyl (dimethoxy) silane (Donor D)) in heptane is also injected into the cell. The polymerization reaction starts under constant pressure by feeding propene and stirring (800 rpm) for 30 min. The reaction is quenched by over-pressurizing the system with dry air and the reactor is cooled to room temperature and vented. The glass cell is removed from the reactor, the solvent is evaporated in a centrifugal evaporator, and the obtained polymer is dried under vacuum overnight. The results of the polymerization are shown in Tables 3 and 4, and in FIGS. 1-5.

Example 11

The use of boron- and organosilicon-based compounds as external donors with catalyst B (hexyl-3-methoxy-2,2-diphenyl-propanoate as disclosed in WO 01/36496 A1). The polymerization procedure disclosed in Example 10 was repeated with the only difference that approximately 0.15 mg of catalyst B was used instead of approximately 0.1 mg. The results of the polymerization are shown in Tables 3 and 4, and FIG. 2.

Example 12

The use of boron- and organosilicon-based compounds as external donors with catalyst C (Bis(2-ethylhexyl) phthalate as disclosed in EP 0045977). The polymerization procedure in Example 10 was repeated. The results are shown in Tables 3 and 4, and FIG. 2.

TABLE 3

Summary of the CEF results of the HPP produced with different precatalysts in presence of boron- and organosilicon-based external donors.

| | $P_{H_2}$: 0.03 bar | | $P_{H_2}$: 0.20 bar | |
|---|---|---|---|---|
| Precatalyst/External Donors | AF (wt %) | $T_{el,\,max}$ (° C.) | AF (wt %) | $T_{el,\,max}$ (° C.) |
| Catalyst A/Donor 1[a] | 5.1 | 116.5 | 6.2 | 115.9 |
| Catalyst A/Donor 3[a] | 5.1 | 116.6 | 5.8 | 115.8 |
| Catalyst A/Donor C[a] | 5.3 | 116.5 | 5.5 | 116.7 |
| Catalyst A/Donor D[a] | 4.9 | 116.8 | 5.7 | 116.6 |
| Catalyst B/Donor 1[a] | NA | NA | 7.2 | 112.3 |
| Catalyst B/Donor 1[b] | NA | NA | 6.9 | 112.3 |
| Catalyst B/Donor 2[b] | NA | NA | 6.0 | 112.5 |
| Catalyst B/Donor C[a] | NA | NA | 5.6 | 113.1 |
| Catalyst B/Donor C[b] | NA | NA | 5.2 | 113.6 |
| Catalyst C/Donor 1[a] | NA | NA | 13.9 | 111.5 |
| Catalyst C/Donor 1[b] | NA | NA | 17.5 | 111.8 |
| Catalyst C/Donor 2[a] | NA | NA | 13.9 | 111.6 |
| Catalyst C/Donor 2[b] | NA | NA | 13.6 | 112.3 |
| Catalyst C/Donor C[a] | NA | NA | 4.4 | 114.3 |
| Catalyst C/Donor C[b] | NA | NA | 4.4 | 115.0 |

[a]Al/Si molar ratio of 100;
[b]Al/Si molar ratio of 7.5

TABLE 4

Summary of the HSEC results of the HPP produced with different catalyst in presence of boron- and organosilicon-based external donors.

| | $P_{H_2}$: 0.03 bar | | | $P_{H_2}$: 0.20 psi | | |
|---|---|---|---|---|---|---|
| Precatalyst/External Donors | Mn (kg/mol) | Mw (kg/mol) | PDI | Mn (kg/mol) | Mw (kg/mol) | PDI |
| Catalyst A/Donor 1[a] | 39/NA | 724/NA | 18.6/NA | 40/NA | 511/NA | 12.7/NA |
| Catalyst A/Donor 3[a] | 56/NA | 691/NA | 12.3/NA | 39/NA | 450/NA | 11.4/NA |
| Catalyst A/Donor C[a] | 38/53 | 827/781 | 21.6/14.8 | 37/34 | 568/411 | 15.5/12.0 |
| Catalyst A/Donor D[a] | 42/49 | 649/610 | 15.3/12.5 | 33/40 | 523/420 | 16.0/10.5 |
| Catalyst B/Donor 1[a] | NA | NA | NA | 20/21 | 106/106 | 4.9/5.3 |

TABLE 4-continued

Summary of the HSEC results of the HPP produced with different catalyst in presence of boron- and organosilicon-based external donors.

| Precatalyst/External Donors | $P_{H_2}$: 0.03 bar | | | $P_{H_2}$: 0.20 psi | | |
|---|---|---|---|---|---|---|
| | Mn (kg/mol) | Mw (kg/mol) | PDI | Mn (kg/mol) | Mw (kg/mol) | PDI |
| Catalyst B/Donor 1[b] | NA | NA | NA | 22/20 | 131/108 | 5.8/5.4 |
| Catalyst B/Donor 2[b] | NA | NA | NA | 24/23 | 129/131 | 5.5/5.7 |
| Catalyst B/Donor C[a] | NA | NA | NA | 21/NA | 113/NA | 5.4/NA |
| Catalyst B/Donor C[b] | NA | NA | NA | 18/23 | 134/129 | 7.3/5.7 |
| Catalyst C/Donor 1[a] | NA | NA | NA | 17/19 | 111/113 | 6.4/5.8 |
| Catalyst C/Donor 1[b] | NA | NA | NA | 17/18 | 108/109 | 6.4/6.6 |
| Catalyst C/Donor 2[a] | NA | NA | NA | 19/17 | 105/102 | 5.6/6.0 |
| Catalyst C/Donor 2[b] | NA | NA | NA | 18/17 | 117/108 | 6.4/6.5 |
| Catalyst C/Donor C[a] | NA | NA | NA | 27/27 | 163/148 | 6.0/5.5 |
| Catalyst C/Donor C[b] | NA | NA | NA | 29/29 | 174/157 | 6.0/5.3 |

[a] Al/Si molar ratio of 100;
[b] Al/Si molar ratio of 7.5

Para. A. A catalyst system for use in olefinic polymerization, the system comprising a solid pre-catalyst component comprising titanium, magnesium, a halogen, and a boron-based internal electron donor.

Para. B. The solid pre-catalyst component of Para. A, wherein the boron-based internal electron donor comprises a boronate.

Para. C. The solid pre-catalyst component of Para. A or B, wherein the boron-based internal electron donor comprises a boron-oxygen bond.

Para. D. The solid pre-catalyst component of Para. A, B, or C, wherein the boron-based internal electron donor comprises a compound represented by Formula (I):

$$B(OR^1)R^2R^3 \qquad (I)$$

wherein:
each $R^1$ is individually H, linear or branched alkyl, cycloalkyl, aryl, heterocyclyl, or heteroaryl, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof;
$R^2$ and $R^3$ are individually linear or branched alkyl, cycloalkyl, aryl, heterocyclyl, heteroaryl, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof, or $OR^1$, or $R^2$ and $R^3$ may join together and with the boron atom to form a borinane ring.

Para. E. The solid pre-catalyst component of Para. D, wherein:
each $R^1$ is individually $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl;
$R^2$ is $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, or $OR^1$; and
$R^3$ is $C_1$-$C_8$ alkyl, $C_3$-$C_{12}$ cycloalkyl, $C_5$-$C_{12}$ aryl, $C_3$-$C_{12}$ heterocyclyl, or $C_5$-$C_{12}$ heteroaryl, or $OR^1$.

Para. F. The solid pre-catalyst component of Para. D or E, wherein:
each $R^1$ is methyl, ethyl, n-propyl, iso-propyl, n-butyl, sec-butyl, tert-butyl, n-pentyl, sec-pentyl, neo-pentyl, cyclohexyl, phenyl, naphthyl, anthracenyl, or an alkylated, arylated, or substituted group thereof.

Para. G. The solid pre-catalyst component of Para. D, E, or F, wherein $R^2$ and $R^3$ are individually $C_1$-$C_8$ alkyl, $C_3$-$C_{12}$ cycloalkyl, $C_5$-$C_{12}$ aryl, or $OR^1$.

Para. H. The solid pre-catalyst component of Para. D, E, or F, wherein $R^2$ and $R^3$ are individually $C_1$-$C_8$ alkyl or $OR^1$.

Para. I. The solid pre-catalyst component of Para. D, wherein the compound of Formula (I) is trimethyl borate, triethyl borate, tri-n-propyl borate, tri-n-butyl borate, dimethyl phenylboronate, diethyl phenylboronate, diethyl-(3,5-di-tert-butylphenyl)boronate, dimethyl-[1,1'-biphenyl]-3-yl-boronate, dimethyl naphthalene-1-yl-boronate, dimethyl cyclohexylboronate, or diethyl cyclohexylboronate.

Para. J. The solid pre-catalyst component of any one of Paras. A-I, wherein the titanium comprises a titanium compound having at least one titanium-halogen bond and the boron-based internal electron donor is supported on a magnesium halide crystal lattice.

Para. K. The solid pre-catalyst component of any one of Paras. A-J, wherein the titanium comprises a titanium compound having at least one titanium-halogen bond and the boron-based internal electron donor is supported on a magnesium dichloride crystal lattice.

Para. L. The solid pre-catalyst component of any one of Paras. A-K, wherein the titanium comprises $TiCl_4$.

Para. M. The solid pre-catalyst component of any one of Paras. A-L, wherein the solid catalyst component further comprises a secondary internal electron donor selected from the group consisting of mono- or poly-carboxylic esters, mono- or poly-carboxylic ethers, or mono- or poly-carboxylic ketones; organic compounds containing carboxylic and ether groups; organic compounds containing carboxylic groups and carbonyl groups; and organic compounds containing carboxylic groups, ether groups, and carbonyl groups.

Para. N. The solid pre-catalyst component of Para. M, wherein the secondary internal electron donor is selected from the group consisting of a compound represented by Formula (II), (III), (IV), (V), (VI), (VII), (VIII), or (IX), wherein:

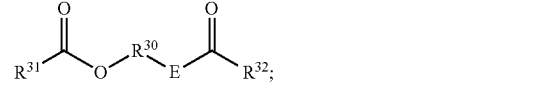

(II)

-continued

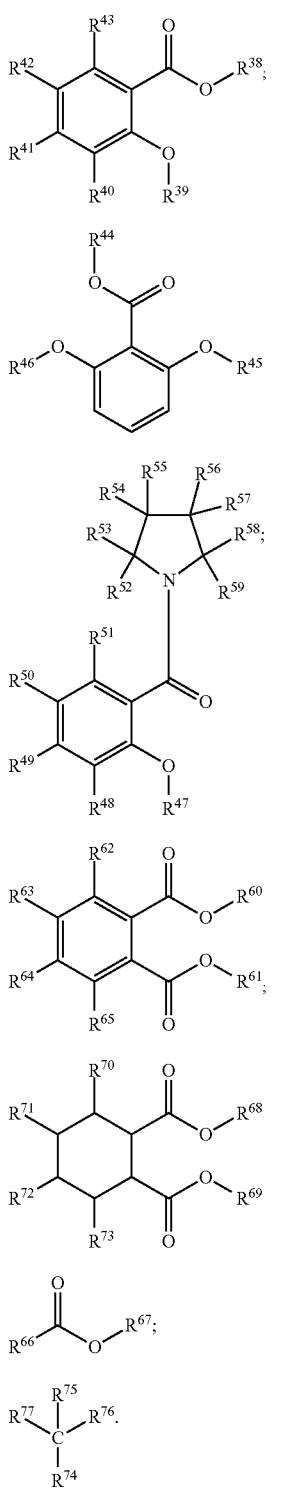

$R^{30}$ is selected from the group consisting of O, —$CR^{33}R^{34}$—, —N(R″)—, S, —P(R″)—, —Si($R^{36}$)$_2$—, cycloalkylene, alkenylene, alkynylene, heterocyclylene, arylene, and heteroarylene;

E is selected from the group consisting of —$CR^{33}R^{34}$—, O, S, OS(=O)$_2$O—, —OS(=O)O—, —S(=O)O—, —N($R^{35}$)—, S, —P($R^{35}$)—, and —Si($R^{36}$)$_2$—;

$R^{31}$ and $R^{32}$ are individually selected from the group consisting of H, $OR^{35}$, $SR^{37}$, $NR^{35}_2$, $PR^{35}_2$, Si($R^{36}$)$_2$, alkyl, alkenyl, alkynyl, cycloalkyl, heterocyclyl, aryl, and heteroaryl;

$R^{35}$ is selected from the group consisting of H, alkyl, and aryl;

$R^{36}$ is selected from the group consisting of H, $OR^{35}$, alkyl, and aryl;

$R^{33}$ and $R^{34}$ are individually selected from the group consisting of is H, alkyl, and cycloalkyl;

$R^{37}$ is selected from the group consisting of haloaryl, haloheteroaryl, and haloheterocyclyl.

$R^{38}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{39}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{40}$, $R^{41}$, $R^{42}$, and $R^{43}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{44}$, $R^{45}$ and $R^{46}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{47}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{48}$, $R^{49}$, $R^{50}$, and $R^{51}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{52}$, $R^{53}$, $R^{54}$, $R^{55}$, $R^{56}$, $R^{57}$, $R^{58}$, and $R^{59}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens;

$R^{60}$ and $R^{61}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens;

$R^{62}$, $R^{63}$, $R^{64}$ and $R^{65}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens;

$R^{66}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens;

$R^{67}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens;

$R^{68}$ and $R^{69}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens; and $R^{70}$, $R^{71}$, $R^{72}$, and $R^{73}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group or a —N═ group in place of a —C═ group, and wherein the hydrocarbyl group is optionally substituted by one or more halogens.

$R^{74}$ and $R^{75}$ are each independently selected from the group consisting of a —CH₂OR⁷⁸, —COOR⁷⁸, —CR⁷⁸═O, —CHO, CH₂OH, —CH₂OSi(R⁷⁸)₃.

$R^{76}$, $R^{77}$, and $R^{78}$ are each independently selected from the group consisting of a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH₂— group; an aryl group; an alkylaryl group; and an arylalkyl group.

Para. O. A solid pre-catalyst component for use in olefinic polymerization, comprising a reaction product of a titanium compound, a magnesium compound, and a boron-based internal electron donor.

Para. P. The solid pre-catalyst component of Para. O, wherein the boron-based internal electron donor comprises a boronate.

Para. Q. The solid pre-catalyst component of Para. O or P, wherein the boron-based internal electron donor comprises a boron-oxygen bond.

Para. R. The solid pre-catalyst component of Para. O, P, or Q, wherein the boron-based internal electron donor comprises a compound represented by Formula (I):

$$B(OR^1)R^2R^3 \tag{I}$$

wherein:

each $R^1$ is individually H, alkyl, cycloalkyl, aryl, heterocyclyl, or heteroaryl;

$R^2$ and $R^3$ are individually alkyl, cycloalkyl, aryl, heterocyclyl, heteroaryl, or $OR^1$, or $R^2$ and $R^3$ may join together and with the boron atom form a borinane ring.

Para. S. The solid pre-catalyst component of any one of Paras. O-R, wherein the titanium comprises a titanium compound having at least one titanium-halogen bond and the boron-based internal electron donor is supported on a magnesium halide crystal lattice.

Para. T. The solid pre-catalyst component of any one of Paras. O-S, wherein the titanium comprises a titanium compound having at least one titanium-halogen bond and the boron-based internal electron donor is supported on a magnesium dichloride crystal lattice.

Para. U. The solid pre-catalyst component of Paras. O-T, wherein the titanium comprises $TiCl_4$.

Para. V. The solid pre-catalyst component of any one of Paras. O-U, wherein the solid catalyst component further comprises at least one secondary internal electron donor selected from the group consisting of mono- or poly-carboxylic esters, ethers, ketones, organic compounds containing carboxylic and ether groups, organic compounds containing carboxylic groups and carbonyl groups, and organic compounds containing carboxylic groups, ether groups, and carbonyl groups.

Para. W. A catalyst system for use in olefinic polymerization, the catalyst system comprising the solid pre-catalyst component of any one of Paras. A-V, and an organoaluminum compound.

Para. X. The catalyst system of Para. W, wherein the organoaluminum compound is represented by chemical Formula (IX):

$$AlR^{80}{-}X_{3-n} \tag{IX}$$

wherein $R^{80}$ a hydrocarbon group, X is a halogen, and n is from greater than 0 to 3.

Para. Y. The catalyst system of Para. X, wherein $R^{80}$ is a $C_1$-$C_{20}$ alkyl.

Para. Z. The catalyst system of Para. X, wherein X is Cl.

Para. AA. A catalyst system for use in olefinic polymerization, the catalyst system comprising the solid pre-catalyst component of any one of Paras. A-V, an organoaluminum compound, and an organosilicon or boron-based compound.

Para. AB. The catalyst system of Para. AA further comprising an organosilicon compound.

Para. AC. The catalyst system of Para. AB, wherein the organosilicon compound is represented by chemical Formula (X):

$$R^{81}{}_n Si(OR^{82})_{4-n'} \tag{X}$$

wherein each $R^{80}$ and $R^{81}$ independently represent a hydrocarbon group, and n' is an integer from 0 to 3.

Para. AD. The catalyst system of Para. AB, wherein the organosilicon compound is represented by chemical Formula (XI):

$$SiR^{81}{}_m R^{83}{}_n (OR^{82})_{3-(m+n)} \qquad (XI)$$

wherein:
$R^{83}$ is a cyclic hydrocarbon or substituted cyclic hydrocarbon;
$R^{81}$ is a hydrocarbon; and
$R^{82}$ is a hydrocarbon;
m is 0, 1, or 2; and
n is 1, 2, or 3.

Para. AE. The catalyst system of any one of Paras. AA-AD, comprising the boron-based compound.

Para. AF. The catalyst system of Para. AE, wherein the boron-based compound is represented by chemical Formula (I):

$$B(OR^1)R^2R^3 \qquad (I)$$

wherein:
each $R^1$ is individually H, alkyl, cycloalkyl, aryl, heterocyclyl, or heteroaryl;
$R^2$ and $R^3$ are individually alkyl, cycloalkyl, aryl, heterocyclyl, heteroaryl, or $OR^1$, or $R^2$ and $R^3$ may join together and with the boron atom form a borinane ring.

Para. AG. A catalyst system for use in olefinic polymerization, the catalyst system comprising the solid pre-catalyst component of any one of Paras. A-V or a solid pre-catalyst comprising an internal electron donor and a boron-based compound.

Para. AH. The catalyst system of Para. AG further comprising an organoaluminum compound represented by chemical Formula (IX):

$$AlR^{80}{}_n X_{3-n} \qquad (IX)$$

wherein $R^{80}$ a hydrocarbon group, X is a halogen, and n is from greater than 0 to 3.

Para. AI. The catalyst system of Para. AH, wherein $R^{80}$ is a $C_1$-$C_{20}$ alkyl.

Para. AJ. The catalyst system of Para. AH, wherein X is Cl.

Para. AK. The catalyst system of Para. AG comprising the boron-based compound.

Para. AL. The catalyst system of Para. AK, wherein the boron-based compound is represented by chemical Formula (I):

$$B(OR^1)R^2R^3 \qquad (I)$$

wherein:
each $R^1$ is individually H, alkyl, cycloalkyl, aryl, heterocyclyl, or heteroaryl;
$R^2$ and $R^3$ are individually alkyl, cycloalkyl, aryl, heterocyclyl, heteroaryl, or $OR^1$, or $R^2$ and $R^3$ may join together and with the boron atom form a borinane ring.

Para. AM. A process of polymerizing or co-polymerizing an olefin monomer, the process comprising:
providing the catalyst system of any one of Paras. W-AL;
polymerizing or co-polymerizing the olefin monomer in the presence of the catalyst system to form a polymer or a co-polymer; and
recovering the polymer or the co-polymer.

Para. AN. The process of Para. AM, wherein the olefin monomer is a mixture of olefin monomers to form a co-polymer and the co-polymer is a random co-polymer, a terpolymer, or an impact co-polymer.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A solid pre-catalyst component comprising: titanium, magnesium, a halogen, an internal electron donor comprising boron, and a secondary internal electron donor; wherein:

the internal electron donor comprising boron is a compound represented by Formula (I):

$B(OR^1)R^2R^3$                 (I)

each $R^1$ is individually H, linear or branched alkyl, cycloalkyl, aryl, heterocyclyl, or heteroaryl, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof;

$R^2$ and $R^3$ are individually linear or branched alkyl, cycloalkyl, aryl, heterocyclyl, heteroaryl, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof, or $OR^1$, or $R^2$ and $R^3$ may join together and with the boron atom to form a borinane ring; and the secondary internal electron donor is (6-benzoyloxydibenzofuran-4-yl) benzoate.

2. The solid pre-catalyst component of claim 1, wherein the titanium comprises a titanium compound having at least one titanium-halogen bond and the internal electron donor is supported on a magnesium halide crystal lattice.

3. The solid pre-catalyst component of claim 1, wherein the titanium comprises a titanium compound having at least one titanium-halogen bond and the internal electron donor is supported on a magnesium dichloride crystal lattice.

4. The solid pre-catalyst component of claim 1, wherein the titanium comprises $TiCl_4$.

5. The solid pre-catalyst component of claim 1, wherein the internal electron donor comprises dimethylphenyl boronate.

6. A catalyst system for use in olefinic polymerization, the catalyst system comprising the solid pre-catalyst component of claim 1, and an organoaluminum compound.

7. A process of polymerizing or co-polymerizing an olefin monomer, the process comprising:

providing a catalyst system comprising:
the solid pre-catalyst component of claim 1; and
an organoaluminum compound;
polymerizing or co-polymerizing the olefin monomer in the presence of the catalyst system to form a polymer or a co-polymer; and
recovering the polymer or the co-polymer.

8. The process of claim 7, wherein the olefin monomer is a mixture of olefin monomers to form a co-polymer and the co-polymer is a random co-polymer, a terpolymer, or an impact co-polymer.

* * * * *